(12) United States Patent
Negishi

(10) Patent No.: US 9,592,605 B2
(45) Date of Patent: Mar. 14, 2017

(54) ROBOT CONTROL METHOD, ROBOT CONTROL APPARATUS, ROBOT CONTROL PROGRAM, AND STORAGE MEDIUM

(71) Applicant: CANON KABUSHIKI KAISHA, Tokyo (JP)

(72) Inventor: Mahito Negishi, Tachikawa (JP)

(73) Assignee: Canon Kabushiki Kaisha, Tokyo (JP)

(*) Notice: Subject to any disclaimer, the term of this patent is extended or adjusted under 35 U.S.C. 154(b) by 25 days.

(21) Appl. No.: 14/550,632

(22) Filed: Nov. 21, 2014

(65) Prior Publication Data
US 2015/0148956 A1 May 28, 2015

(30) Foreign Application Priority Data
Nov. 25, 2013 (JP) .................................. 2013-242722

(51) Int. Cl.
*B25J 9/16* (2006.01)

(52) U.S. Cl.
CPC ...... *B25J 9/163* (2013.01); *G05B 2219/41177* (2013.01); *G05B 2219/42124* (2013.01); *Y10S 901/02* (2013.01); *Y10S 901/28* (2013.01)

(58) Field of Classification Search
CPC ........... B25J 9/163; G05B 2219/41177; G05B 2219/42124
See application file for complete search history.

(56) References Cited

U.S. PATENT DOCUMENTS 5,168,550 A * 12/1992 Sakaue ............... G06N 3/084
706/25

5,627,944 A * 5/1997 Fujimoto ............... G06N 3/10
700/4

(Continued)

FOREIGN PATENT DOCUMENTS

CN 1762670 A 4/2006
CN 101013309 A 8/2007
(Continued)

OTHER PUBLICATIONS

Ciliz et al., "Intelligent Control of Robotic Manipulators: A Multiple Model Based Approach", (1995), Intelligent Robots and Systems, IEEE/RSJ International Conference on Intelligent Robots and Systems, IEEE/RSJ International Conference pp. 422-427.

(Continued)

*Primary Examiner* — Khoi Tran
*Assistant Examiner* — Ryan Rink
(74) *Attorney, Agent, or Firm* — Canon U.S.A. Inc., IP Division

(57) ABSTRACT

An evaluation value $E_k$ on a trajectory error $e_k$ between an actual trajectory $y_k$ and a target trajectory x is calculated. In a case where the calculated evaluation value $E_k$ is better than a best evaluation value $E_{best}$, the best evaluation value $E_{best}$ is updated by the evaluation value $E_k$ and is stored. A commanded trajectory $u_k$ in this situation is employed as a best commanded trajectory $u_{best}$ and stored. In a case where the calculated evaluation value $E_k$ is worse than the best evaluation value $E_{best}$, a compensator that calculates a correction of the trajectory $\Delta u_{k+1}$ is changed to another compensator and the correction of the trajectory $\Delta u_{k+1}$ is calculated. A commanded trajectory in the next-time operation $u_{k+1}$ is calculated from the correction of the trajectory $\Delta u_{k+1}$ and the best commanded trajectory $u_{best}$.

5 Claims, 14 Drawing Sheets

(56) References Cited

U.S. PATENT DOCUMENTS

| | | | | |
|---|---|---|---|---|
| 2006/0082340 | A1* | 4/2006 | Watanabe | B25J 9/163 |
| | | | | 318/568.21 |
| 2006/0224532 | A1* | 10/2006 | Duan | G06N 3/08 |
| | | | | 706/15 |
| 2007/0205738 | A1* | 9/2007 | Iwashita | G05B 19/404 |
| | | | | 318/568.1 |

FOREIGN PATENT DOCUMENTS

| | | |
|---|---|---|
| CN | 102198659 A | 9/2011 |
| EP | 1814000 A2 | 8/2007 |
| JP | 2001-182785 A | 7/2001 |
| JP | 2006-110702 A | 4/2006 |
| WO | 2007/111252 A1 | 10/2007 |

OTHER PUBLICATIONS

Feng et al., Fuzzy Supervisor Based Multiple Model Adaptive Controller for Systems with Uncertain Parameters, Oct. 5-8, 2003, Proceedings of the 2003 IEEE International Symposium on Intelligent Control, pp. 930-934.

Albertos, et al., "On Line Learning Control of a Gantry Crane", Jul. 17-19, 2000, pp. 157-162, Proceedings of the 15th IEEE International Symposium on Intelligent Control (ISIC 2000) Rio, Patras, Greece.

\* cited by examiner

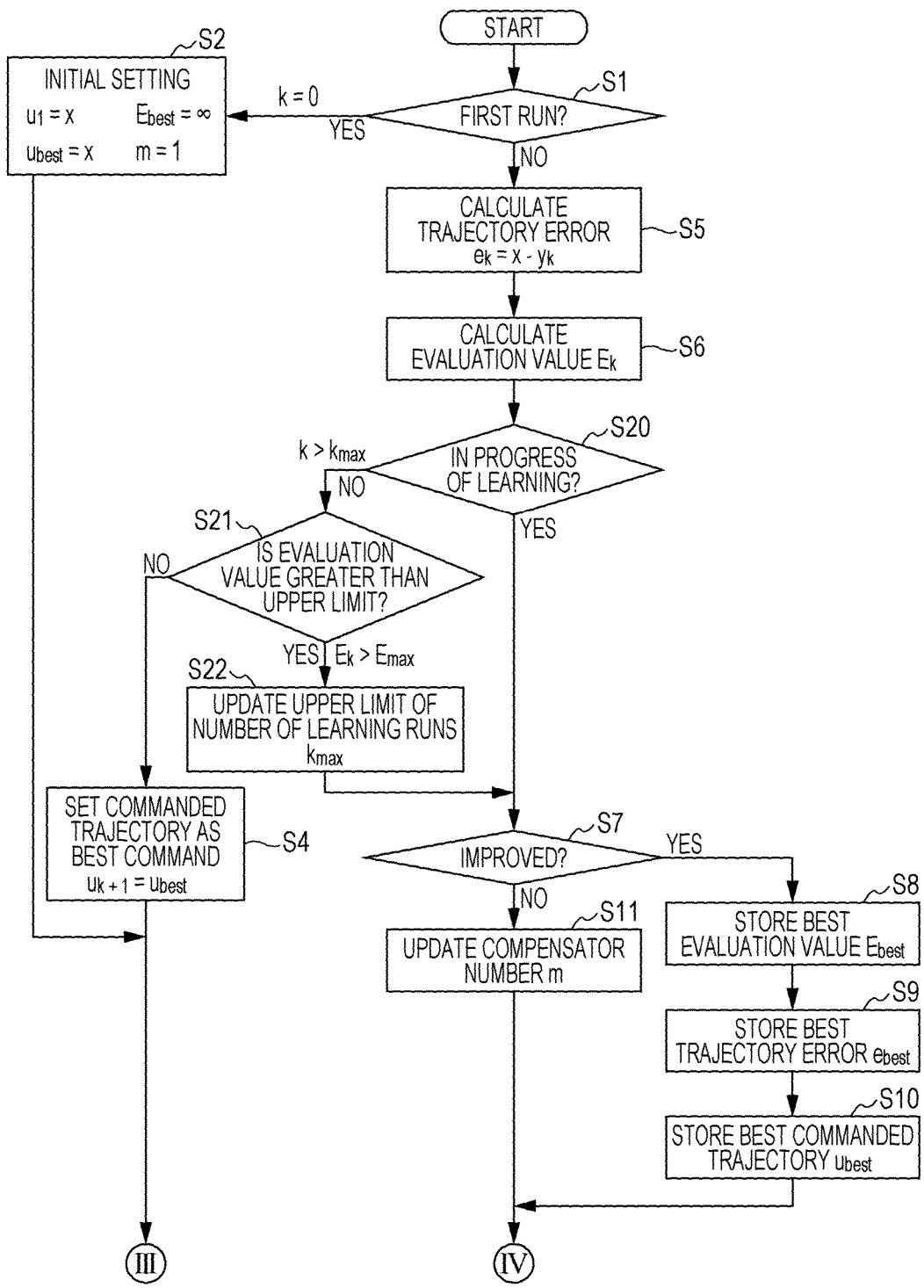

ROBOT CONTROL METHOD, ROBOT CONTROL APPARATUS, ROBOT CONTROL PROGRAM, AND STORAGE MEDIUM

BACKGROUND OF THE INVENTION

Field of the Invention

The present invention relates to a robot control method and a robot control apparatus capable of learning a commanded trajectory based on a trajectory error between a commanded trajectory and an actual trajectory and controlling the commanded trajectory.

Description of the Related Art

In recent years, intensive efforts have been made to realize a robotic system including a robot capable of quickly performing a complicated assembling process as well as human hands are capable. Ideally, when a target trajectory is specified by a commanded trajectory, a robot is driven exactly along the target trajectory. However, in practice, a trajectory tracking error may occur between the actual trajectory and the commanded trajectory. Besides, as the speed of driving the robot increases, the trajectory error increases.

To reduce such a trajectory error, it has been proposed to perform a learning control such that a next operation result is learned based on a previous operation result (Japanese Patent Laid-Open No. 2006-110702). In the technique disclosed in Japanese Patent Laid-Open No. 2006-110702, a robot is driven according to a commanded trajectory, and an actual trajectory is measured using a sensor or the like. Using a proportional-integral-derivative (PID) compensator, a correction of the trajectory is calculated based on the trajectory error between the actual trajectory and the commanded trajectory, and a next commanded trajectory is generated by adding the correction of the trajectory to the current commanded trajectory. By learning the commanded trajectory each time the robot is driven in the above-described manner, it is tried to achieve the actual trajectory of the robot as close to the target trajectory as possible. An assembling process performed by a robot is usually a repetition of basic operations, and thus it is rather easy to achieve an expected improvement by the learning in the above-described manner.

However, even in the technique disclosed in Japanese Patent Laid-Open No. 2001-182785, there is a restriction on the reduction in trajectory error. That is, the trajectory error may be caused by an operation delay in a servo control system and a vibration of a robot. Joints of a robot are driven by a servo control system in which a control bandwidth is not infinitely wide but is limited, and the limitation on the control bandwidth makes it difficult for the actual trajectory to exactly follow the commanded trajectory, and thus a trajectory error may occur. Furthermore, the rigidity of joints and the rigidity of a main body of the robot are not infinitely high but are limited, and thus any movement of the robot may cause a vibration with a natural frequency to occur, which may result in a trajectory error. In particular, a trajectory error caused by a vibration is characterized in that the vibration has a large amplitude in a frequency range around the natural frequency, and an output has a phase different by 180° from that of an input.

To ensure high stability in the servo control system, the control frequency band is usually set to be lower than the natural frequency of the robot. However, this causes the servo control system to have a delay in response in a low frequency range and to cause the robot to have a vibration in a high frequency range, which may be main causes of the error. A similar situation may occur also in a control loop in a learning control system. Thus, to ensure high stability in the learning control, the control frequency band is set to be lower than the natural frequency of the robot. However, as a result, the robot may have a vibration in a range higher than the control frequency band of the learning control system which makes it difficult to reduce the trajectory error caused by the vibration of the robot. Therefore, it is difficult to reduce the trajectory error by the learning control using the technique disclosed in Japanese Patent Laid-Open No. 2001-182785.

Another possible control method is to model a robot and configure a compensator used in the learning control so as to operate according to an inverse model thereof. However, practically, an inevitable error occurs in modeling, which may create an adverse influence. This is known as a spill-over problem. For the reasons described above, there is a restriction on designing a compensator to be capable of reducing the vibration of the robot, and there is a trajectory error that is difficult to reduce by the learning control.

To handle the above-described situation in which it is difficult to reduce the trajectory error, the gain of the compensator may be reduced to achieve high stability in the learning control. However, the reduction in gain results in a reduction in speed of adjusting the trajectory error. As a result, a large number of iterations of learning is necessary, which results in a reduction in the learning speed. Besides, in the learning control, noise may occur in the middle of measurement of the actual trajectory, and such noise may cause the trajectory error to become worse compared with a previous trajectory error. In this case, in the learning control according to the technique disclosed in Japanese Patent Laid-Open No. 2001-182785, the learning control is continued from a degraded state, and thus a large number of iterations of learning is necessary, which results in a reduction in the learning speed.

SUMMARY OF THE INVENTION

Aspects of the invention generally provide a robot control method and a robot control apparatus capable of reducing a trajectory error and increasing a learning speed.

According to an aspect of the invention, a robot control method is capable of, by a control unit, controlling a robot so as to be driven according to a commanded trajectory, detecting an actual trajectory along which the robot is driven, and controlling the commanded trajectory by learning based on a trajectory error between the actual trajectory and a target trajectory. The method includes calculating, by the control unit, an evaluation value on the trajectory error, and controlling, by the control unit, the commanded trajectory by learning. The controlling by learning includes 1) storing, by the control unit, a good state such that in a case where the calculated evaluation value is better than an evaluation value stored in a storage unit, the evaluation value stored in the storage unit is updated by the calculated evaluation value and stored in the storage unit, and the commanded trajectory stored in the storage unit is updated by the commanded trajectory given when the trajectory error is evaluated, 2) changing, by the control unit, a compensator such that in a case where the calculated evaluation value is worse than the evaluation value stored in the storage unit, the currently selected compensator is changed to another compensator that is included in a plurality of compensators configured to calculate an amount of correction of the commanded trajectory from the trajectory error and that is configured to calculate the amount of correction in a different manner from the manner in which the currently selected compensator calculates the amount of correction, and 3) calculating, by the control unit, a commanded trajectory in a next-time operation such that the amount of correction for the commanded trajectory stored in the storage unit is calculated using the selected compensator, and the commanded trajectory in the next-time operation is calculated from the calculated amount of correction and the commanded trajectory stored in the storage unit.

According to an aspect of the invention, a robot control apparatus is capable of controlling a robot so as to be driven according to a commanded trajectory, detecting an actual trajectory along which the robot is driven, and controlling the commanded trajectory by learning based on a trajectory error between the actual trajectory and a target trajectory. The apparatus includes a control unit configured to calculate an evaluation value on the trajectory error and perform the controlling by learning, and a storage unit capable of storing the evaluation value and the commanded trajectory. The control unit is configured to perform the controlling by learning such that in a case where the calculated evaluation value is better than the evaluation value stored in the storage unit, the evaluation value stored in the storage unit is updated by the calculated evaluation value and stored in the storage unit, and the commanded trajectory stored in the storage unit is updated by the commanded trajectory given when the trajectory error is evaluated, in a case where the calculated evaluation value is worse than the evaluation value stored in the storage unit, a compensator selected from a plurality of compensators configured to calculate an amount of correction of the commanded trajectory from the trajectory error is changed to another compensator configured to calculate the amount of correction in a different manner from the manner in which the currently selected compensator calculates the amount of correction, the amount of correction of the commanded trajectory stored in the storage unit is calculated using the currently sleeted compensator, and a commanded trajectory in the next-time operation is calculated from the calculated amount of correction and the commanded trajectory stored in the storage unit.

Further features of the present invention will become apparent from the following description of exemplary embodiments with reference to the attached drawings.

BRIEF DESCRIPTION OF THE DRAWINGS

FIGS. 15A and 15B are flow charts illustrating a learning control process according to a fourth embodiment.

DESCRIPTION OF THE EMBODIMENTS

First Embodiment

Figure 1:
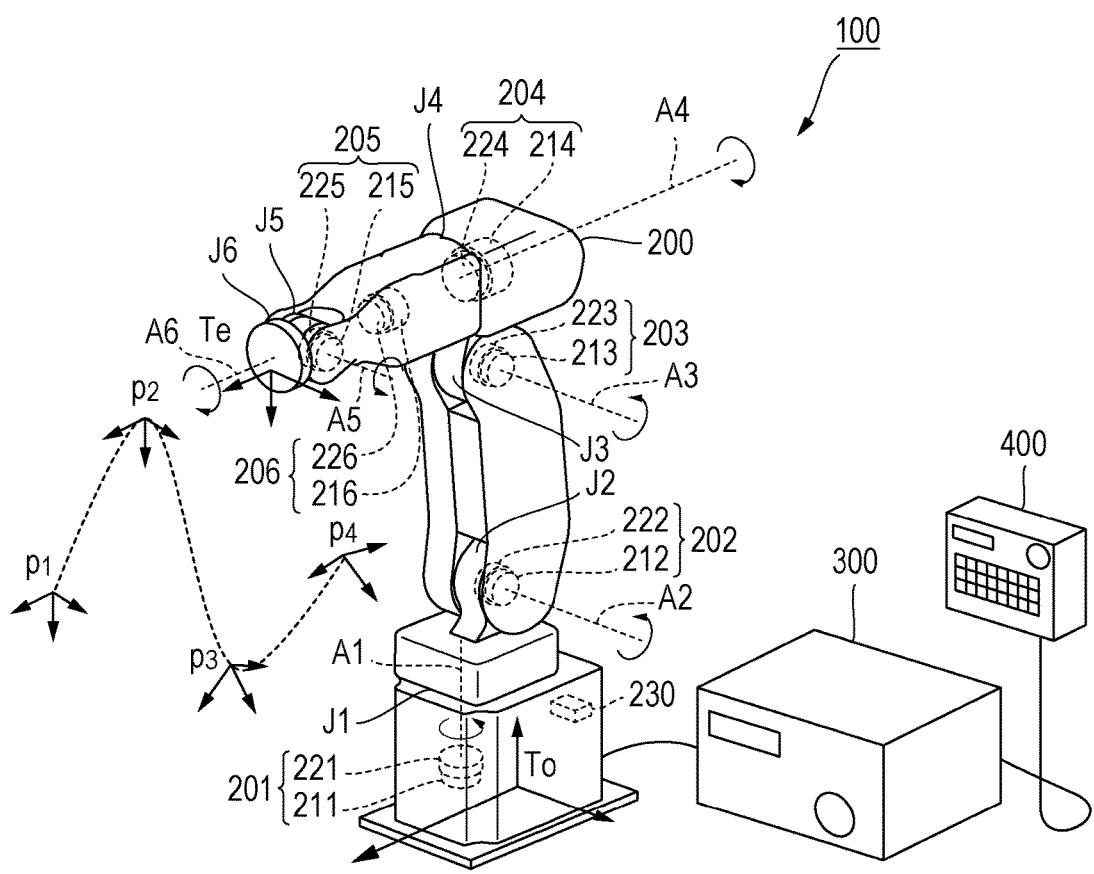
FIG. 1 is a diagram schematically illustrating a structure of a robot apparatus.

A first embodiment is described below with reference to FIG. 1 to FIG. 11. First, a general structure of a robot apparatus is described. As illustrated in FIG. 1, a robot apparatus 100 includes a robot arm (robot) 200 functioning as a multijoint robot and a robot control apparatus 300 that controls the robot arm 200. The robot apparatus 100 further includes a teaching pendant 400 functioning as a teaching apparatus that transmits a plurality of pieces of teaching-point data to the robot control apparatus 300. The teaching pendant 400 is operated by a human operator to specify an operation of the robot arm 200 or the robot control apparatus 300.

In the present embodiment, the robot arm 200 is, for example, a 6-joint robot. The robot arm 200 has a plurality of (more specifically, six) actuators 201 to 206 that drive the respective joints J1 to J6 to rotate about corresponding joint axes A1 to A6. The robot arm 200 is capable of moving such that a tip of a hand (an end point) of the robot arm 200 is located at any specified position within an allowed range and the tip points in any specified 3D-direction. The position and the posture of the robot arm 200 are generally expressed using a coordinate system. In FIG. 1, To denotes a coordinate system fixed on a base of the robot arm 200, and Te denotes a coordinate system fixed on the end point (the tip of the hand) of the robot arm 200.

In the present embodiment, the actuators 201 to 206 respectively include electric motors 211 to 216 and reduction gears 221 to 226 connected to the respective electric motors 211 to 216. The respective reduction gears 221 to 226 are connected to frames driven by the corresponding joints J1 to J6 via belts or bearings (not illustrated). Note that the structure of each of the actuators 201 to 206 is not limited to that described above, and one or all of the actuators may be configured differently. For example, an artificial muscle or the like may be employed for one or all of the actuators. A rotation detection sensor such as an encoder or the like is disposed for each of the reduction gears 221 to 226 such that the angle of the joint is detected by the rotation detection sensor. Detecting the angle of each of the joints J1 to J6 makes it possible to calculate the position and the posture of the tip of the robot arm and thus it becomes possible to detect the actual trajectory of the robot arm 200.

Alternatively, the position of the tip of the robot arm may be measured using a camera or the like and the actual trajectory may be determined thereby.

The robot arm 200 further includes a servo control unit 230 that controllably drives the electric motors 211 to 216 of the respective actuators 201 to 206. The servo control unit 230 controls the operations of the electric motors 211 to 216 by outputting current commands to the electric motors 211 to 216 based on the input commanded trajectory such that the positions of the respective joints J1 to J6 move according to the commanded trajectory. Note that although in the present embodiment it is assumed by way of example that there is provided only one servo control unit 230, there may be provided a plurality of servo control units such that each of the electric motors 211 to 216 is controlled by corresponding one of the servo control units.

In FIG. 1, four teaching points $p_1$, $p_2$, $p_3$, and $p_4$ are shown. When the robot arm 200 is driven for the first time, these teaching points are given, for example, by a human operator using the teaching pendant 400. Note that the teaching points are not points in a so-called three-dimensional space. In a case where the robot is moved in a joint space, the teaching points are represented by joint angles. In a case where the robot is moved in a task space, the teaching points indicates positions and postures in a 3-dimensional space, and these teaching points $p_1$, $p_2$, $p_3$, and $p_4$ are represented in a coordinate system as illustrated in FIG. 1. That is, the teaching point is not a point in the 3-dimensional space but a vector.

The robot control apparatus 300 is a computer that generates a trajectory passing through the teaching points by interpolation between adjacent teaching points thereby generating a target trajectory x. The trajectory initially set based on teaching points taught by the teaching pendant 400 or the like is employed as a target, and thus in the present specification, the initially-set trajectory is referred to as a target trajectory x (represented by a dotted line in FIG. 1), and a commanded trajectory given to the servo control unit 230 is referred to as a commanded trajectory u. T denotes an operation time in which the robot is moved according to the target trajectory. Because each teaching point is represented by a vector, the target trajectory x is represented by time-series vector data, that is, 2-dimensional array data.

The angle of each joint of the robot arm 200 is controlled by the servo control unit 230 according to the target trajectory given by the robot control apparatus 300. The servo control unit 230 operates the robot arm 200 according to the input commanded trajectory u, and outputs an actual trajectory y as an operation result. Note that the actual trajectory y is represented by time-series vector data as with the target trajectory x, that is, the actual trajectory y is given by two-dimensional array data. Note that the target trajectory x may be represented by joint angles of the respective joint or by coordinate values in an orthogonal coordinate system.

Figure 2:
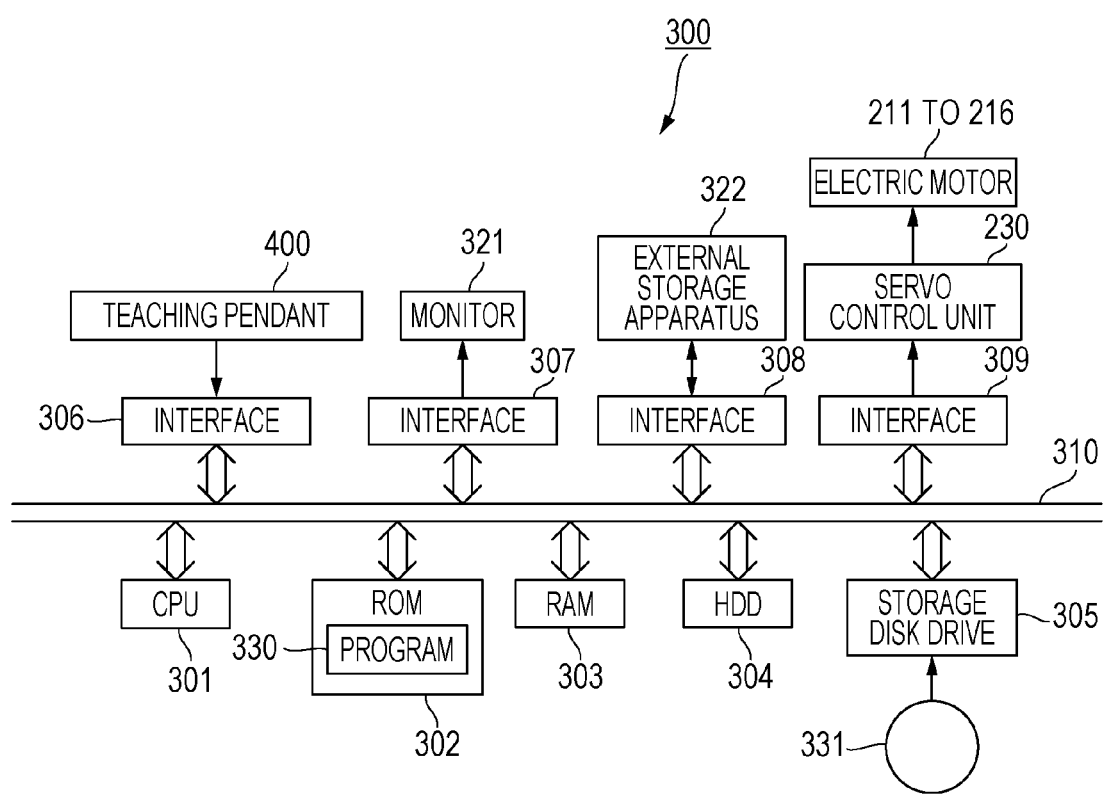
FIG. 2 is a block diagram illustrating a configuration of a robot control apparatus.

Next, a general configuration of the robot control apparatus 300 is described below with reference to FIG. 2. The robot control apparatus 300 includes a CPU 301 functioning as a control unit, a ROM 302, RAM 303, a hard disk driver (HDD) 304, and a storage disk drive (storage medium) 305, functioning as a storage unit, and various interfaces 306 to 309.

The CPU 301 is connected via a bus 310 to the ROM 302, the RAM 303, the HDD 304, the storage disk drive 305, and the various interfaces 306 to 309. In the ROM 302, programs 330 for operating the CPU 301 are stored. The programs 330 include a robot control program. More specifically, the robot control program is a program that controls various parts (see FIG. 3) to execute various operations and processes. The RAM 303 is a storage unit capable of temporarily storing a result or the like of an operation performed by the CPU 301. The HDD 304 is a storage unit for storing a result of an operation and various kinds of data (including a best commanded trajectory, a best evaluation value, and the like).

The teaching pendant 400 is connected to the interface 306 such that the CPU 301 is allowed to receive an input from the teaching pendant 400 via the interface 306 and the bus 310.

The servo control unit 230 is connected to the interface 309 such that the CPU 301 is allowed to output target trajectory data at predetermined time intervals to the servo control unit 230 via the bus 310 and the interface 309.

The interface 307 is connected to a monitor 321, and various kinds of images are displayed on the monitor 321. The interface 308 is capable of being connected to an external storage device 322 such as a rewritable nonvolatile memory, an external HDD, or the like. The storage disk drive 305 is capable of reading out various kinds of data, programs, and the like from a storage disk (storage medium) 331. The storage medium for storing the programs according to the present disclosure is not limited to the storage disk 331 but a nonvolatile memory, an external HDD, or the like, such as the external storage device 322, may also be employed.

Figure 3:
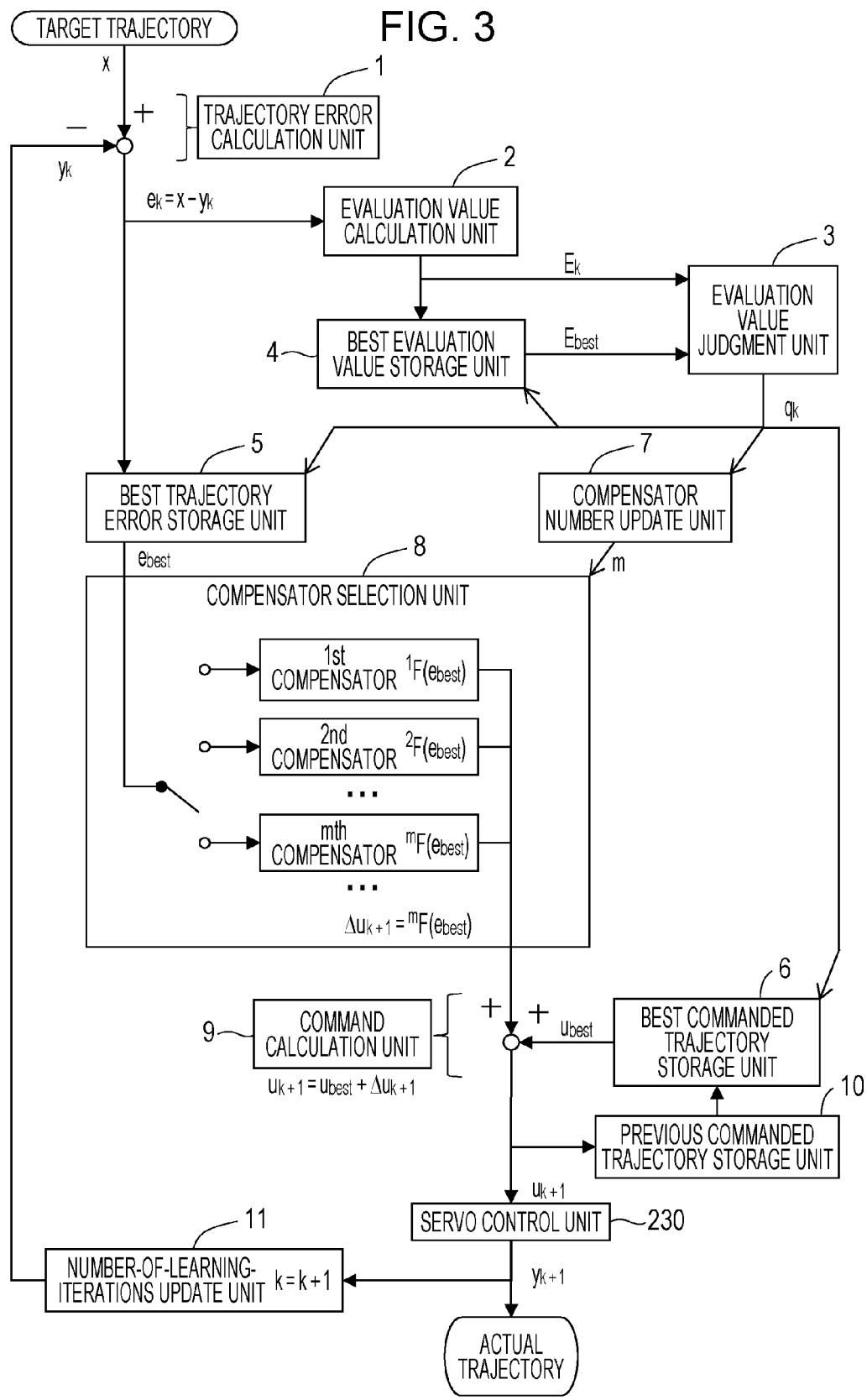
FIG. 3 is a block diagram illustrating a learning control according to a first embodiment.

Next, the learning control according to the present embodiment is described below with reference to FIGS. 3 to 11. First, referring to FIG. 3, operations of units associated with the learning control are described. In FIG. 3, a symbol k is used to express that a k-th iteration of learning is now being performed. That is, the value of k indicates the number of iterations of learning performed. Note that the value of k is initially set to 0.

As illustrated in FIG. 3, the robot control apparatus 300 includes a trajectory error calculation unit 1, an evaluation value calculation unit 2, an evaluation value judgment unit 3, a best evaluation value storage unit 4, and a best trajectory error storage unit 5. The robot control apparatus 300 further includes a beset commanded trajectory storage unit 6, a compensator number update unit 7, a compensator selection unit 8, a command calculation unit 9, a previous commanded trajectory storage unit 10, and a number-of-learning-iterations update unit 11. Note the these units described above are realized by executing the program 330 by the CPU 301.

The trajectory error calculation unit 1 calculates a trajectory error $e_k$ between an actual trajectory $y_k$ and a target trajectory x according to formula (1) described below. Note that the trajectory error $e_k$ is also time-series vector data, that is, 2-dimensional array data as with the target trajectory x and the actual trajectory $y_k$.

$$e_k = x - y_k \quad (1)$$

The evaluation value calculation unit 2 calculates an evaluation value $E_k$ from the trajectory error $e_k$. More specifically, the evaluation value $E_k$ is calculated, for example, according to formula (2) described below where stdev is a function that returns a standard deviation.

$$E_k = \text{stdev}(e_k) \quad (2)$$

Alternatively, the evaluation value $E_k$ may be determined simply by calculating a peak-to-valley (PV) value according to formula (3) described below.

$$E_k = \max(e_k) - \min(e_k) \quad (3)$$

The evaluation value judgment unit 3 compares the evaluation value $E_k$ with a best evaluation value $E_{best}$ described below and outputs an evaluation result $q_k$. The evaluation result $q_k$ is a variable that takes two values one of which indicates that the evaluation value $E_k$ is further better than the best evaluation value $E_{best}$ (that is, the result is evaluated as good) and the other one of which indicates that the evaluation value $E_k$ is worse than the best evaluation value $E_{best}$ (that is, the result is evaluated as bad). That is, the evaluation result $q_k$ indicates whether the trajectory error is improved or degraded. In a case where the evaluation result $q_k$ has the improved value (that is, the result is evaluated as good), the best evaluation value storage unit 4 discards a current best evaluation value $E_{best}$ and stores the evaluation value $E_k$ as a new best evaluation value $E_{best}$. In the case where the evaluation result $q_k$ has the improved value (that is, the result is evaluated as good), the best trajectory error storage unit 5 discards a current best trajectory error $e_{best}$ and stores the trajectory error $e_k$ as a new best trajectory error $e_{best}$. In the case where the evaluation result $q_k$ has the improved value (that is, the result is evaluated as good), the beset commanded trajectory storage unit 6 discards a current best commanded trajectory $u_{best}$ and updates the best commanded trajectory with a previous commanded trajectory $u_k$ stored in the previous commanded trajectory storage unit 10.

In the case where the evaluation result $q_k$ has the improved value, the compensator number update unit 7 outputs the same compensator number m as the previous compensator number. In the case where the evaluation result $q_k$ has the degraded value, the compensator number update unit 7 updates the compensator number m and outputs the updated compensator number. The updating of the compensator number m is performed, for example, by incrementing the compensator number by one each time the updating is performed. The compensator number m starts with one. When all compensators have been selected, the compensator number m is returned to one.

The compensator selection unit 8 selects the compensator according to the compensator number m identifying the compensator and applies the selected compensator to the best trajectory error $e_{best}$ thereby outputting a correction of the trajectory (amount of correction) $\Delta u_{k+1}$ according to formula (4) described below. Note that the best trajectory error $e_{best}$ and the correction of the trajectory $\Delta u_{k+1}$ are also time-series vector data, that is, 2-dimensional array data.

$$\Delta u_{k+1} = {}^m F(e_{best}) \tag{4}$$

Examples of the compensators are listed below.

(1) A proportional compensator according to a following formula $$\Delta u_{k+1} = \Gamma_1 e_{best} \tag{5}$$

where $\Gamma_1$ is a constant called a proportional gain.

(2) An integral compensator according to a following formula $$\Delta u_{k+1} = \Gamma_2 \int e_{best} dt \tag{6}$$

where $\Gamma_2$ is a constant called an integral gain.

(3) A derivative compensator according to a following formula $$\Delta u_{k+1} = \Gamma_3 \frac{d}{dt} e_{best} \tag{7}$$

where $\Gamma_3$ is a constant called a derivative gain.

(4) A PID compensator according to a following formula $$\Delta u_{k+1} = \left(\Gamma_1 + \Gamma_2 \int dt + \Gamma_3 \frac{d}{dt}\right) e_{best} \tag{8}$$

which is a combination of compensators (1) to (3).

(5) A low pass filter (LPF) that allows low frequencies to pass through. For a first-order LPF, its transfer function is defined by formula (9) described below.

$$T(s) = \frac{1}{1 + \frac{s}{2\pi f_c}} \tag{9}$$

In formula (9), $f_c$ denotes a cutoff frequency, and s denotes a Laplace transform variable. A filter having the transfer function $T(s)$ described above may be designed using a bilinear transform or the like. A detailed description of the design method is omitted here, but a result may be given by formula (10) described below. Note that formula (10) includes the cutoff frequency as a parameter.

$$\Delta u_{k+1} = \text{LPF}(e_{best}, f_c) \tag{10}$$

(6) A second-order derivative compensator according to a following formula.

$$\Delta u_{k+1} = \Gamma_6 \frac{d^2}{dt^2} e_{best} \tag{11}$$

In a case where the target trajectory x is defined by positions, the second-order derivative corresponds to acceleration. Thus, in this compensator, the acceleration is fed back. In the acceleration feedback, the amount of feedback is larger at higher frequencies, and thus the acceleration feedback is effective, in particular, to suppress the vibration of the robot. $\Gamma_6$ is a constant.

(7) A time delay compensator or a time advance compensator according to a following formula.

$$\Delta u_{k+1}(t) = \begin{cases} 0 & t + t_0 < 0 \\ e_{best}(t + t_0) & 0 < t + t_0 < T \\ 0 & T < t + t_0 \end{cases} \tag{12}$$

In this compensator, a best trajectory error $e_{best}$ is shifted in terms of time, and a result is employed as a correction of the trajectory $\Delta u_{k+1}$. In formula (12), $t_0$ denotes an amount of the shift of time. When $t_0$ is negative, the compensation is performed in a time delay compensation mode, while when $t_0$ is positive, the compensation is performed in a time advance compensation mode. When the operation time gets out of the range from 0 to T, the trajectory error is treated as 0. In a case where the frequency of the vibration of the robot is substantially constant, the vibration may be suppressed by setting $t_0$ to be equal to the vibration period.

(8) A notch filter that allows only a particular frequency component not to pass through. Its transfer function is defined by formula (13) described below.

$$T(s) = \frac{\left(\frac{s}{2\pi f_0}\right)^2 + 1}{\left(\frac{s}{2\pi f_0}\right)^2 + \frac{1}{Q}\left(\frac{s}{2\pi f_0}\right) + 1} \tag{13}$$

In formula (13), $f_c$ denotes a rejection frequency, a Q value is a dimensionless number indicating sharpness, and s denotes a Laplace transform variable. A filter having the transfer function $T(s)$ described above may be designed using a bilinear transform or the like. A detailed description of a designing process is omitted here, but a result may be given by formula (14) described below. Note that formula (14) includes the rejection frequency $f_0$ and the Q value as parameters.

$$\Delta u_{k+1} = \text{NOTCH}(e_{best}, f_0, Q) \quad (14)$$

Note that by setting $f_0$ to be equal to the vibration frequency of the robot it is possible to prevent the vibration from causing the correction of the trajectory $\Delta u_{k+1}$ to become great.

The command calculation unit 9 calculates a commanded trajectory in the next-time operation $u_{k+1}$ by adding the correction of the trajectory $\Delta u_{k+1}$ to the best commanded trajectory $u_{best}$ according to formula (15) described below. Note that because this commanded trajectory is used as the commanded trajectory in the next-time iteration, the subscript k indicating the number of iterations of learning is incremented by 1 and thus is changed to k+1.

$$u_{k+1} = u_{best} + \Delta u_{k+1} \quad (15)$$

The previous commanded trajectory storage unit 10 stores the resultant next-time commanded trajectory $u_{k+1}$. After a next-time driving is performed on the robot arm 200, if the evaluation value $E_{k+1}$ is better than the best evaluation value $E_{best}$ then the stored next-time commanded trajectory $u_{k+1}$ is used by the beset commanded trajectory storage unit 6. The servo control unit 230 operates the robot arm 200 according to the commanded trajectory $u_{k+1}$ and outputs an actual trajectory $y_{k+1}$ as an operation result. The number-of-learning-iterations update unit 11 increments the subscript k indicating the number of iterations of learning, that is, the number-of-learning-iterations update unit 11 counts the number of iterations of learning.

Next, the learning control operation according to the present embodiment is described with reference to a flow chart illustrated in FIGS. 4A and 4B. This flow chart represents a first-time operation in iterations in each of which the robot arm 200 is driven according to the same target trajectory x. The number of iterative operations is represented by the number of iterations of learning k. In the first iteration, k is set such that k=0.

When the driving of the robot arm 200 is started and thus the learning control operation according to the present embodiment is started, it is determined whether the driving operation of the robot arm 200 is in an initial iteration or not (S1). In a case where the driving operation is in the initial iteration (Y in S1) the processing flow proceeds to step S2, but otherwise (N in S1) the processing flow proceeds to step S3.

For example, in a case where the driving operation of the robot arm 200 is in the initial iteration and thus the processing flow proceeds to step S2, then the first commanded trajectory $u_1$ and the best commanded trajectory $u_{best}$ are set to be equal to the target trajectory x ($u_1$=x, and $u_{best}$=x). Furthermore, the present best evaluation value $E_{best}$ is set to a bad value, and more specifically, the present best evaluation value $E_{best}$ is set to be a large value or infinity ($E_{best}$=∞). Furthermore, the compensator number m is set to 1 (m=1). Thereafter, the processing flow proceeds to step S15, in which the commanded trajectory $u_1$ is stored as a previous commanded trajectory in a next iteration of learning. Next, in step S16, the robot arm 200 is operated according to the commanded trajectory $u_1$ (input to the servo control unit 230). As a result, an actual trajectory $y_k$ (output) is obtained. Next, in step S17, the number of iterations of learning k is incremented by 1 (k=k+1), and the first-time operation of the robot arm 200 is ended.

In a case where the operation of the robot arm 200 is in a second or following iterations (N in S1), the processing flow proceeds to step S3, in which it is determined whether the learning is in progress or not, that is, whether the number of iterations of learning k is equal to or less than the maximum number of iterations $k_{max}$. In a case where it is determined that the number of iterations of learning k is greater than the maximum number of iterations $k_{max}$, this means that the learning has been so advanced that the calculation of the commanded trajectory using the compensator provides no further improvement as will be described in detail later, and thus the processing flow proceeds to step S4 (the learning is stopped). In step S4, the commanded trajectory $u_{k+1}$ is set to be equal to the best commanded trajectory $u_{best}$ stored in the storage unit ($u_{k+1}$=$u_{best}$). Thereafter steps S15 to S17 are performed. The commanded trajectory $u_{k+1}$ is stored just in case as the previous commanded trajectory, and the robot arm 200 is actually driven according to the commanded trajectory $u_{k+1}$ (that is, according to the best commanded trajectory $u_{best}$). The number of iterations of learning k is then incremented by 1, and the present iteration of learning is ended.

On the other hand, in a case where it is determined in step S3 that the learning is in progress (Y in S3), the processing flow proceeds to step S5. In step S5, first, the trajectory error calculation unit 1 calculates a trajectory error $e_k$ between the previous actual trajectory $y_k$ and the target trajectory x ($e_k$=x−$y_k$). Thereafter, the evaluation value calculation unit 2 calculates an evaluation value $E_k$ from the trajectory error $e_k$ (evaluation value calculation step) (S6).

Next, a learning control operation is started. First, the evaluation value judgment unit 3 compares the calculated evaluation value $E_k$ with the best evaluation value $E_{best}$ and determines whether evaluation value $E_k$ is improved or not (S7), and the evaluation value judgment unit 3 outputs an evaluation result $q_k$. In a case where the evaluation value $E_k$ is improved such that the evaluation value $E_k$ is better than the best evaluation value $E_{best}$ (Y in S7), the processing flow proceeds to step S8. However, in a case where the evaluation value $E_k$ is degraded such that the evaluation value $E_k$ is worse than the best evaluation value $E_{best}$ (N in S7), the processing flow proceeds to step S11. In a case where the operation of the robot arm 200 is in a second iteration (k=1), the evaluation value $E_k$ is always improved because the best evaluation value $E_{best}$ is initially set to infinity, and thus the processing flow proceeds to step S8.

In step S8, because the evaluation value $E_k$ is improved such that the evaluation value $E_k$ is better than the best evaluation value $E_{best}$, the best evaluation value storage unit 4 updates the best evaluation value $E_{best}$ with the evaluation value $E_k$ and stores the updated best evaluation value $E_{best}$ (good state storing step). Next, in step S9, the best trajectory error storage unit 5 updates the best trajectory error $e_{best}$ by the trajectory error $e_k$ improved to be better than the previous trajectory error and stores the updated best trajectory error $e_{best}$. In step S10, the beset commanded trajectory storage unit 6 updates the best commanded trajectory $u_{best}$ by commanded trajectory $u_k$ improved to be better than the previous commanded trajectory (good state storing step).

On the other hand, in step S11, because the evaluation value $E_k$ is degraded such that the evaluation value $E_k$ is worse than the best evaluation value $E_{best}$, the compensator number update unit 7 updates the compensator number m by incrementing it by 1 (compensator changing step). In step S12, the compensator selection unit 8 selects the compensator according to the compensator number m (compensator changing step). That is, in the case where the evaluation value $E_k$ is improved such that the evaluation value $E_k$ is better than the best evaluation value $E_{best}$, step S11 is not performed and thus the compensator number m is not updated and the compensator is not changed. On the other hand, in the case where the evaluation value $E_k$ is degraded such that the evaluation value $E_k$ is worse than the best evaluation value $E_{best}$, the compensator number m is updated in step S11 and thus the currently selected compensator is changed to another compensator that performs a calculation differently from the current compensator.

In step S13, the compensator selection unit 8 applies the compensator to the best trajectory error $e_{best}$ thereby calculating the correction of the trajectory $\Delta u_{k+1}$ and outputting the result (next trajectory calculation step). Next, in step S14, the command calculation unit 9 calculates the next-time commanded trajectory $u_{k+1}$ by adding the correction of the trajectory $\Delta u_{k+1}$ to the best commanded trajectory $u_{best}$ (next trajectory calculation step).

Thereafter, the processing flow proceeds to step S15 described above in which the commanded trajectory $u_{k+1}$ is stored as the previous commanded trajectory for use in the next iteration of learning. Next, in step S16, the robot arm 200 is operated according to the commanded trajectory $u_{k+1}$ (input to the servo control unit 230). As a result, an actual trajectory $y_{k+1}$ (output) is obtained. Next, in step S17, the number of iterations of learning k is incremented by 1 (k=k+1) (counting step), and the kth-time iterative operation of the robot arm 200 is ended.

Note that although in the present embodiment it is assumed by way of example that there is provided only one servo control unit 230, there may be provided a plurality of servo control units such that each of the electric motors 211 to 216 is controlled by corresponding one of the servo control units. In this case, the learning control operation may be performed on each of all servo control units corresponding to the respective electric motors 211 to 216 or the learning control operation may be performed at least on a servo control unit corresponding to an electric motor 211 located farthest away from the tip of the robot arm. This is because a greatest error tends to occur on the electric motor 211 located farthest away from the tip of the robot arm.

Next, a simulation of the learning control operation according to the present embodiment is described below with reference to a flow chart illustrated in FIGS. 4A and 4B. In this simulation, for easier understanding, it is assumed that the system to be controlled is a single-axis rotary joint. Note that simulation of a prismatic joint may be performed in a similar manner to the rotary joint. It is assumed that an output trajectory y, which is a result of a response to a commanded trajectory u, is represented by a transfer function shown in formula (16) described below.

$$\frac{w_0^2}{s^2 + 2\xi w_0 s + w_0^2} \quad (16)$$

Note that the transfer function represented by formula (16) is a transfer function known as a second-order delay. In formula (16), $w_0$ denotes a natural resonance frequency, and $\xi$ denotes a critical damping ratio. This transfer function provides a characteristic simulating a vibration of the robot arm.

Figure 5:
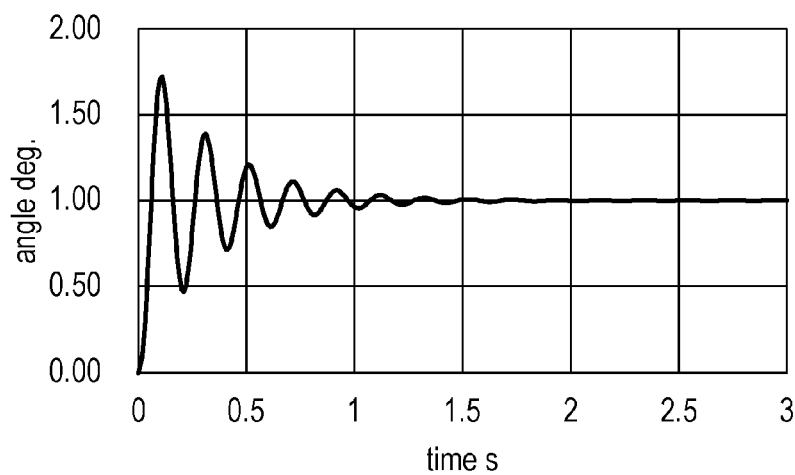
FIG. 5 is a diagram illustrating a simulated step response.
Figure 6:
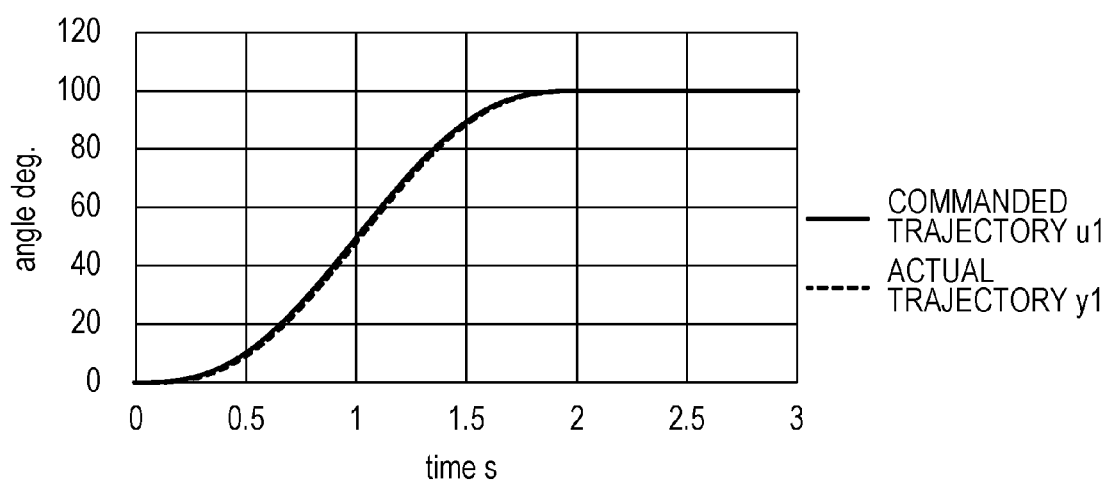
FIG. 6 is a diagram illustrating simulated target trajectory and actual trajectory.

In the present simulation, it is assumed that the frequency is equal to 5 Hz, that is, $w_0=2\pi f_c=10\pi$ and $\xi=0.1$. When the above condition is assumed, a resultant step response is shown in FIG. 5. In this case, the response approaches a target value of 1 while vibrating as illustrated in FIG. 5. In the actual robot, not such a step response but a smooth trajectory is employed as the target trajectory. In the present simulation, as described below, a quintic curve that moves by 100° in two seconds is used.

First, in the initial setting in step S2, an initial commanded trajectory $u_1$ is given by a target trajectory x defined by a quintic curve. In step S16, the robot is operated according to the commanded trajectory $u_1$. FIG. 16 illustrates a result of calculation of the output trajectory $y_1$ in response to the commanded trajectory $u_1$ according to formula (16) described above. When seen on this scale, there is no significant difference observed between the commanded trajectory $u_1$ and the output trajectory $y_1$.

Figure 7:
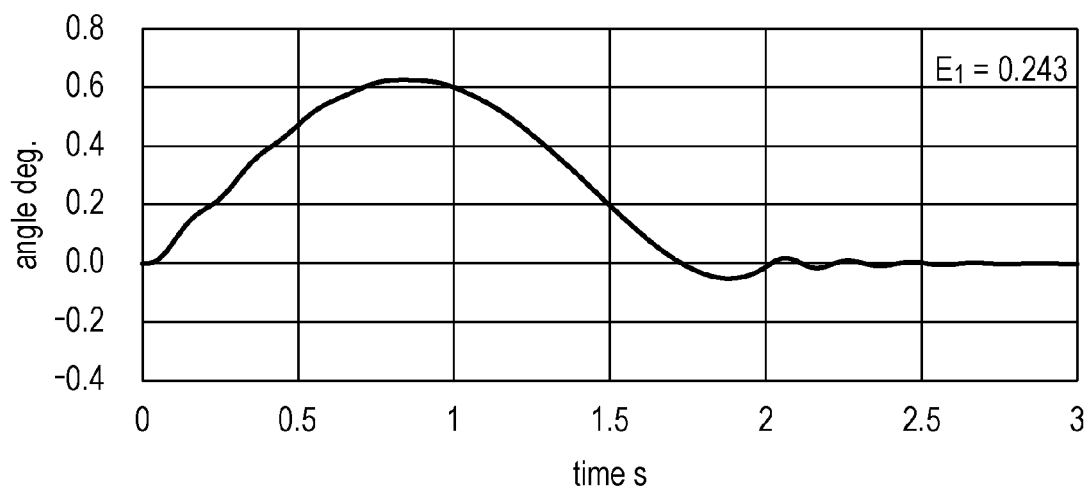
FIG. 7 is a diagram illustrating a simulated trajectory error after a first-time learning is performed.

However, when the number of iterations of learning is updated to k=1 in step S17 and the trajectory error $e_1$ is calculated in step S5, then a result becomes as illustrated in FIG. 7. As may be seen from in FIG. 7, the trajectory error $e_1$ is still large. Because the output trajectory $y_1$ has a delay with respect to the commanded trajectory $u_1$, the trajectory error $e_1$ is positive.

If the standard deviation is employed as the evaluation value, then $E_1=0.243$ is obtained as a result of the calculation of the evaluation value in step S6. This evaluation value is represented in an upper right corner of FIG. 7. Because the best evaluation value $E_{best}$ is initially set to a worst value (infinity) in step S2, it is determined in step S7 that the evaluation value is improved. As a result, in steps S8 to S10, the evaluation value $E_1$ is employed as the best evaluation value $E_{best}$, the trajectory error $e_1$ is employed as the best trajectory error $e_{best}$, and the commanded trajectory $u_1$ is employed as the best commanded trajectory $u_{best}$, and they are stored.

A proportional compensator with a gain of 1 is employed as a first compensator. Although this compensator is effective to handle a low-frequency error, an oscillation tends to occur for a high-frequency error. In steps S12 and S13, the correction of the trajectory $\Delta u_2$ is calculated. In step S14, the commanded trajectory in the next-time operation $u_2$ is calculated. Then in step S17, the number of iterations of learning is updated to k=2.

Figure 8:
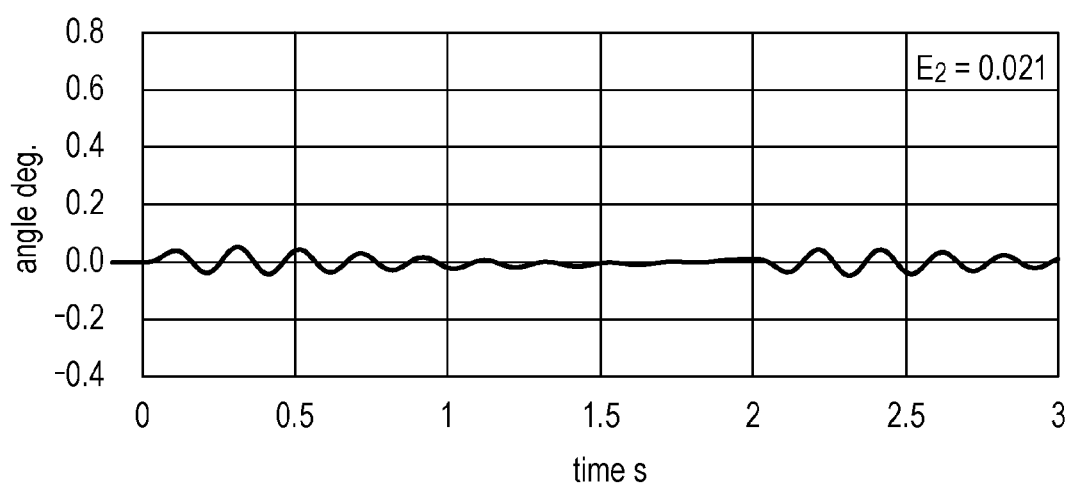
FIG. 8 is a diagram illustrating a simulated trajectory error after a second-time learning is performed.

Subsequently, an output trajectory $y_2$, which is a result of a response to the commanded trajectory $u_2$, is calculated according to formula (16) described above. In steps S5 and S6, a trajectory error $e_2$ and an evaluation value $E_2$ are calculated, and results are obtained as illustrated in FIG. 8. $E_2=0.021$ is obtained as the evaluation value, which indicates that a significant improvement has been obtained. Thus, in step S7, it is again determined that an improvement is obtained. In steps S13 and S14, the commanded trajectory in the next-time operation $u_3$ is calculated using the same proportional compensator as that used in the previous iteration. In step S17, the number of iterations of learning is updated to k=3.

Figure 9:
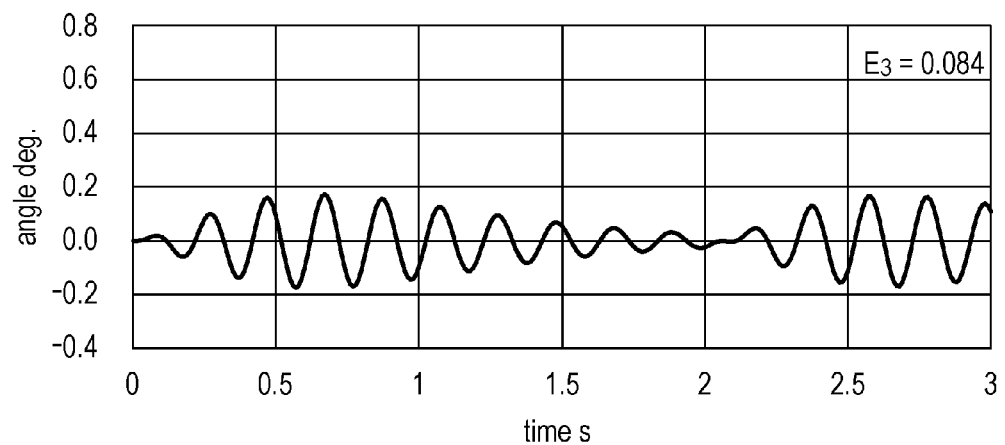
FIG. 9 is a diagram illustrating a simulated trajectory error after a third-time learning is performed.

Furthermore, the output trajectory $y_3$, which is a result of a response to the commanded trajectory $u_3$, is calculated according to formula (16) described above. In steps S5 and S6, a trajectory error $e_3$ and an evaluation value $E_3$ are calculated, and results are obtained as illustrated in FIG. 9. $E_3=0.084$ is obtained as the evaluation value, which indicates that degradation occurs in this iteration. Note that high-frequency vibration components are observed because the robot arm is excited at its natural frequency of 5 Hz. This means that there is a possibility that the learning control may result in degradation in the trajectory error. Although not illustrated in figures, further learning using the same compensator results in further degradation, which means that when learning using the same compensator is continued as is performed in the conventional learning control technique, there is a possibility that degradation in trajectory error may occur.

However, in the present embodiment, the actual operation is performed as described below. In step S7, it is determined that the evaluation value $E_3$ is degraded, and thus in step S11 the compensator number is updated to m=2. In the present simulation, the second compensator is a compensator that is a series connection of a lowpass filter with a cutoff frequency of 1 Hz and a time advance compensator with a time advance compensation time of 80 ms.

Note that the cutoff frequency of the lowpass filter is set to be lower than the natural frequency of the controlled apparatus. If the cutoff frequency is set otherwise, the lowpass filter is not capable of attenuating the natural vibration of the controlled apparatus to a sufficiently low level. Furthermore, the time advance compensation time is set to be shorter than the vibration period of the natural vibration of the controlled apparatus. If the time advance compensation is set otherwise, overlapping occurs between adjacent peaks in vibration and thus the effect of the advance compensation is lost. Therefore, in the present simulation the cutoff frequency of the lowpass filter is set to 1 Hz which is lower than the natural frequency 5 Hz of the controlled apparatus, and the time advance compensation time is set to 80 ms which is shorter than the vibration period of the natural vibration 200 ms of the controlled apparatus. Note that in a case where the operation includes seeking suitable values of parameters such as a cutoff frequency, a time advance compensation time, and the like, it is not necessary to precisely determine these values in advance as described in detail later with reference to a second embodiment.

Note that in the present embodiment, when degradation in trajectory error e occurs, the commanded trajectory u that leaded to the degradation is not used but the best commanded trajectory $u_{best}$ is used, and thus amplification of the error does not occur even when any compensator is used in calculation, which ensures high stability. Therefore, even if the commanded trajectory is calculated using a combination of formulae (compensators), no problem occurs.

Using the above-described compensator that is the series connection of the lowpass filter and the time advance compensator, the commanded trajectory in the next-time operation $u_4$ is calculated in steps S13 and S14. Note that it is important that when degradation occurs, then the trajectory error $e_3$ and the commanded trajectory $u_3$ are not used, but the commanded trajectory $u_4$ is calculated using the best trajectory error $e_{best}$ and the best commanded trajectory $u_{best}$. This makes it possible to prevent degradation from exerting an adverse influence on a next learning process. Then in step S17, the number of iterations of learning is updated to k=4.

Figure 10:
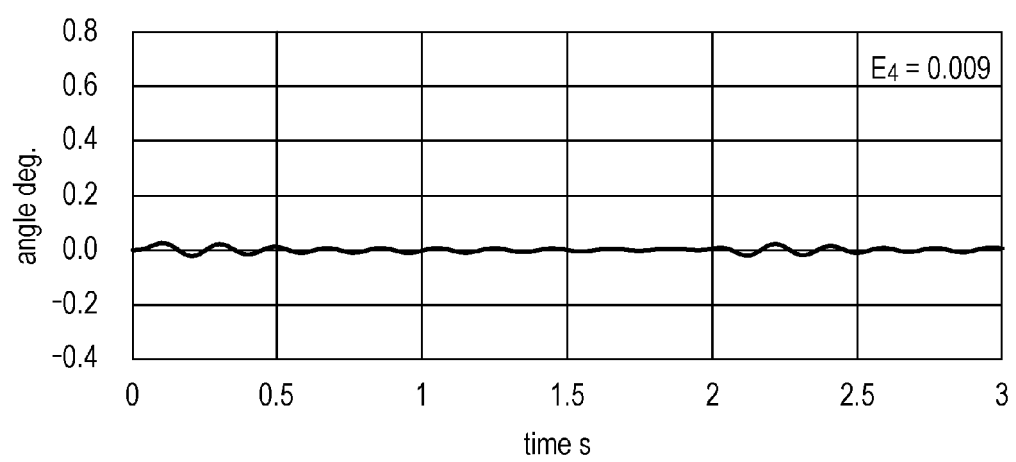
FIG. 10 is a diagram illustrating a simulated trajectory error after a fourth-time learning is performed.

Subsequently, an output trajectory $y_4$, which is a result of a response to the commanded trajectory $u_4$, is calculated according to formula (16) described above. In steps S5 and S6, a trajectory error $e_4$ and an evaluation value $E_4$ are calculated, and results are obtained as illustrated in FIG. 10. $E_4$=0.009 is obtained as the evaluation value, which indicates that a significant improvement is obtained. Thus it is determined in step S7 that the evaluation value is improved. In steps S13 and S14, the next-time (fifth-time) commanded trajectory $u_5$ is calculated using the same compensator as that used in the previous iteration (fourth iteration). In step S17, the number of iterations of learning is updated to k=5.

Figure 11:
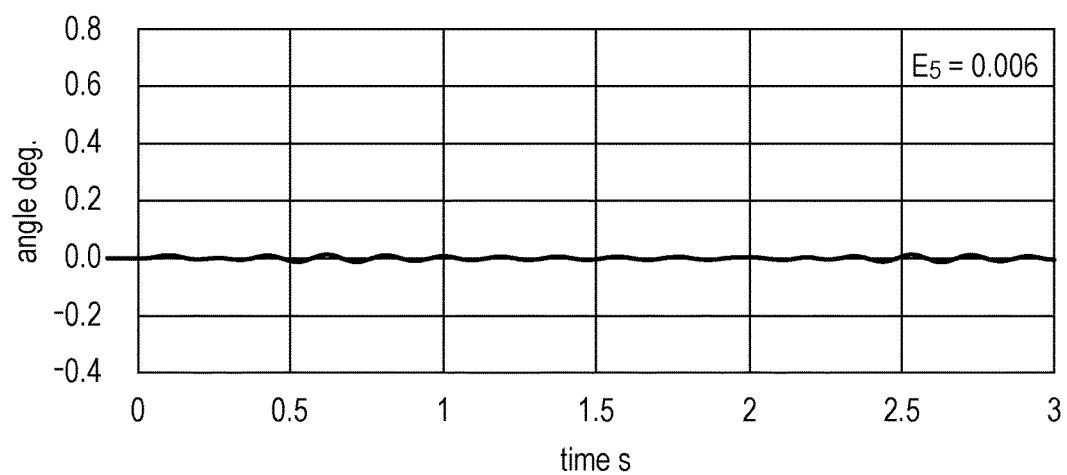
FIG. 11 is a diagram illustrating a simulated trajectory error after a fifth-time learning is performed.

Subsequently, an output trajectory $y_5$, which is a result of a response to the commanded trajectory $u_5$, is calculated according to formula (16) described above. In steps S5 and S6, a trajectory error $e_5$ and an evaluation value $E_5$ are calculated, and results are obtained as illustrated in FIG. 11. $E_5$=0.006 is obtained as the evaluation value, and thus a further improvement has been obtained.

As described above, in the present simulation, the first evaluation value $E_1$=0.243 is improved by the learning control process using the proportional compensator to $E_2$=0.021. However, thereafter, degradation occurs. The compensator is automatically switched to another effective compensator, and thus the evaluation value is improved to $E_5$=0.006.

As described above, the simulation has indicated that the changing of the compensator is effective to improve the learning result. Note that even in a case where the changing of the compensator does not lead to an improvement in the learning result, a further changing of the compensator in step S11 is performed repeatedly to seek a good compensator until it is determined in step S7 that an improvement is achieved. In step S3 it is determined whether the number of iterations of learning has exceeded a maximum number of iterations. If so, then in any following process, the best commanded trajectory $u_{best}$ obtained via the past learning is always specified in step S4 as being used. It may be desirable to set the maximum number of iterations such that when the maximum number of iterations is reached, further seeking a compensator is stopped because no further improvement in learning result is obtained using any compensator.

In the robot control apparatus 300, as described above, when the evaluation value $E_k$ for the trajectory error $e_k$ becomes better than the best evaluation value $E_{best}$ stored in the storage unit (for example, the RAM 303), the commanded trajectory $u_k$ used in this situation is stored. Therefore, the stored best commanded trajectory $u_{best}$ is updated to a better commanded trajectory, which prevents the commanded trajectory from being degraded by learning. On the other hand, in a case where the evaluation value $E_k$ for the trajectory error $e_k$ becomes worse than the best evaluation value $E_{best}$, the commanded trajectory $u_k$ given in this situation is not stored, and the compensator that calculates the correction of the trajectory $\Delta u_{k+1}$ of the commanded trajectory $u_{k+1}$ is changed to another compensator. Thus, it is possible to sequentially handle various different control frequency bands such as a low frequency band, a high frequency band, and the like, and thus it is possible to achieve a further better learning effect. Therefore, by repeating the learning control operation, it is possible to improve the trajectory error e, that is, it is possible to reduce the trajectory error e.

For example, when learning is continued using a compensator that is unstable from the point of view of the feedback control theory, an oscillation may occur in the commanded trajectory given as a result of the learning, that is, the learning control operation may become unstable. In contrast, in the robot control apparatus 300 according to the present embodiment, when the evaluation value $E_k$ becomes worse, the current compensator is changed to another compensator and thus it is possible to prevent the learning control operation from becoming unstable. Therefore, it is allowed to select a compensator from various compensators without concern for stability.

For example, when the trajectory error e suddenly becomes worse than the previous trajectory error due to noise or for some other reasons, if the commanded trajectory u given in this situation is stored and the learning control operation is continued, the learning control operation is continued from a state in which the commanded trajectory u becomes worse, and thus a delay occurs in the progress of the learning. However, in the robot control apparatus 300 according to the present embodiment, the degraded commanded trajectory u is not used in the next learning but the learning control operation is continued always using the best commanded trajectory $u_{best}$. Therefore, even an occurrence of degradation in the evaluation value E does not influence the next learning, and it is possible to prevent a reduction in the learning speed from occurring due to the degradation in the evaluation value E.

Furthermore, in the robot control apparatus 300 according to the present embodiment, it is allowed to select a compensator in such a manner that a high-gain compensator is first selected to achieve a quick convergence although it may have instability, and a low-gain compensator is selected when the evaluation value E becomes worse. This makes it possible to increase the learning speed.

Although the proportional compensator is effective to handle low frequencies, it may be unstable in high frequencies. On the other hand, a compensator realized by connecting in series a lowpass filter and a time advance compensator is effective to handle high frequencies. However, this type of compensator is not very effective at low frequencies, and thus a large number of repetitions of learning is necessary. In view of the above, in the robot control apparatus 300 according to the present embodiment, a proportional compensator is employed as a compensator in the beginning, and the compensator is changed, as necessary, a compensator realized by connecting in series a lowpass filter and a time advance compensator. This makes it possible to quickly make a correction on low frequency components and then a correction on remaining high frequency components in a high efficiency manner, which allows it to increase the learning speed. If the order of using compensators is reversed, the proportional compensator may produce a degradation for high frequency components and thus a high learning effect is not achieved.

Furthermore, in the robot control apparatus 300 according to the present embodiment, the compensator is changed in the middle of the learning process. Depending on the selection of the compensator, there is a possibility that an improvement is not obtained in a newly calculated commanded trajectory, which may cause the robot arm 200 to repeat an unimproved operation. To handle the above-described situation, a maximum number of iterations is set to define the maximum allowable number of learning operations, and further learning is stopped when the number of learning operations exceeds the maximum number of iterations thereby preventing the unimproved operation from being performed. When the further learning is stopped, the operation is performed based on the best commanded trajectory and thus it is possible to continue the operation in a good manner.

Second Embodiment

Next, a second embodiment, which is a partial modification of the first embodiment, is described below with reference to FIG. 12 and FIG. 13. The second embodiment is different from the first embodiment in that a process is added to seek parameters of a compensator. In the compensator according to the conventional learn-and-control technique, parameters such as a gain of the compensator are determined in advance. However, optimum values of the parameters are not necessarily known in advance, and the selection of the parameter values may determine the performance of the lean-and-control process. For example, it is allowed to reduce the number of repetitions of learning by setting the gain to a large value. However, in this case, high stability may be lost and an oscillation may occur, which may make it impossible to perform the learning control operation. It is very clear to select good parameter values, but parameter values suitable for the learning control operation are not known in advance, and thus it is difficult to achieve high performance in the learning control operation. In the case of robots, a motion characteristic varies greatly depending on the posture of a robot or a manner of moving the robot. Therefore, even a slight change in condition may cause it to be necessary to reset parameter values to obtain a good operation, which may cause a human operator to perform a very troublesome job. That is, practically, it is difficult to determine suitable parameter values. The second embodiment provides a technique of handling such a difficult situation.

Each compensator is defined by a formula and parameters included in the formula. For example, in the case of the compensators described above with reference to formula (4), each compensator is defined by formula (17) described below.

$$\Delta u_{k+1} = {}^m F(e_{best}, {}^m p) \qquad (24)$$

where ${}^m p$ denotes a parameter of an m-th compensator. Depending on the type of the compensator, the compensator may include a plurality of parameters. For example, a PID compensator include three parameters, that is, a proportional gain, an integral gain, and a derivative gain.

Figure 12:
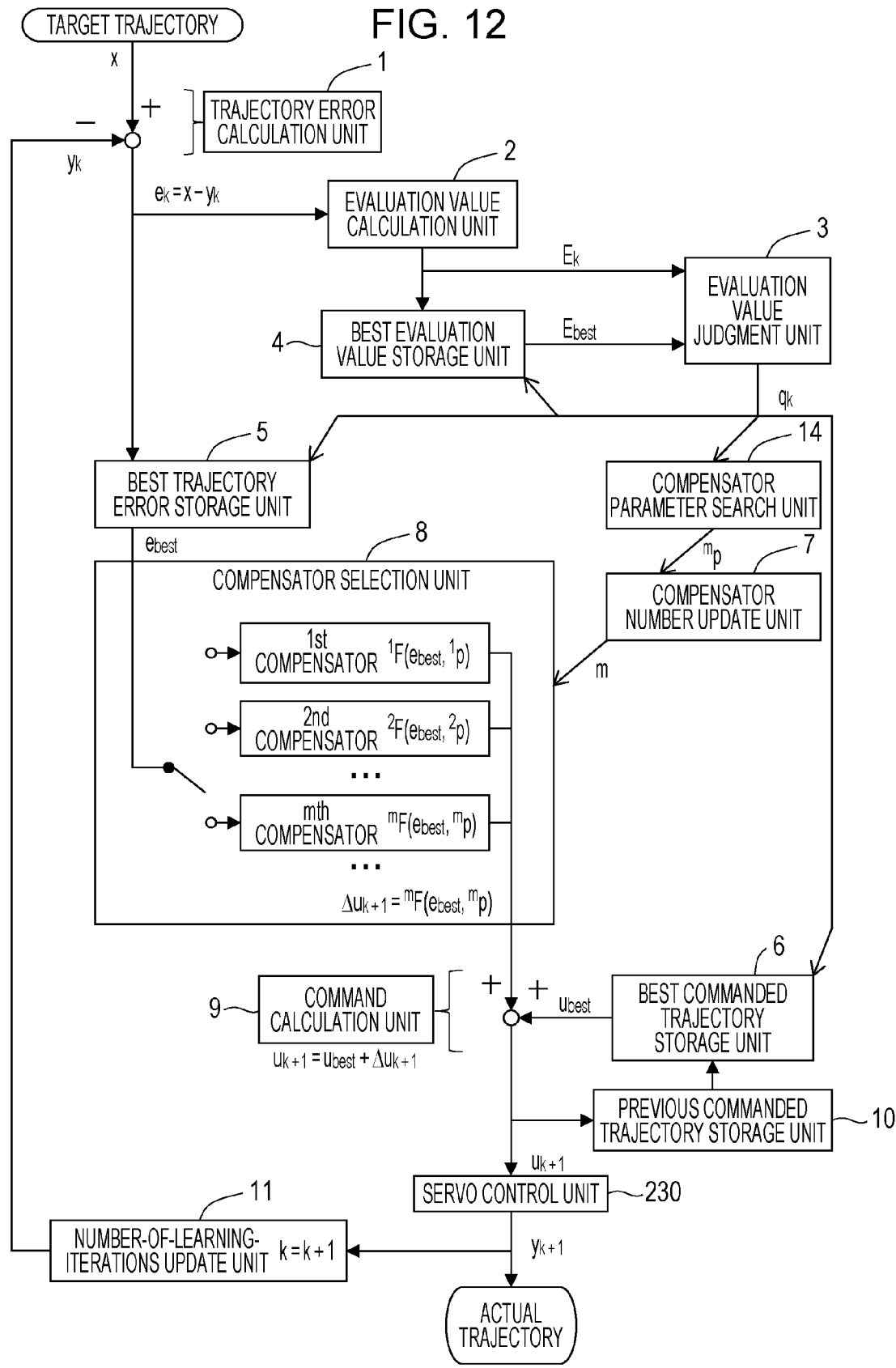
FIG. 12 is a block diagram illustrating a learning control according to a second embodiment.

In the second embodiment, there is provided a compensator parameter seeking unit 14 as illustrated in FIG. 12. In the present embodiment, as will be described in further detail below, the compensator parameter seeking unit 14 optimizes a parameter ${}^m p$ included in a formula defining a compensator. After the parameter ${}^m p$ is optimized, the compensator number update unit 7 updates the compensator number m to change the formula of the compensator.

Next, the learning control according to the second embodiment is described below with reference to FIG. 13. In this flow chart illustrated in FIG. 13, step S11 in the flow chart illustrated in FIG. 4A is replaced. Steps other than step S11 are similar to those illustrated in FIG. 4A, and thus those similar steps are described below with reference to steps illustrated in FIGS. 4A and 4B. In FIG. 13, a part surrounded by a dash-dot line 14 represents a control process performed by the compensator parameter seeking unit 14, and a part surrounded by a dash-dot line 7 represents a control process performed by the compensator number update unit 7.

As with the first embodiment, in a case where an improvement is obtained in the evaluation result $q_k$ given by the evaluation value judgment unit 3, the processing flow proceeds from step S7 to steps S8 to S10. In this case, because no change occurs in terms of the compensator number m and the parameter p, the same compensator used in the previous operation is selected in step S12 (see FIG. 4A). On the other hand, in a case where degradation occurs in the evaluation result $q_k$, the processing flow proceeds from step S7 to step S11-1 illustrated in FIG. 13.

In step S11-1, it is determined whether a seeking direction d is positive or negative. In a case where the seeking direction d is positive, the processing flow proceeds to step S11-2, but in a case where the seeking direction d is negative, the processing flow proceeds to step S11-5. Note that the seeking direction d is initially set to be positive.

In step S11-2, it is determined whether the value of the parameter parameter ${}^m p$ is within a predetermined range (seeking range). In a case where the parameter parameter ${}^m p$ is within the seeking range, the processing flow proceeds to step S11-3. However, in a case where the parameter parameter $^m p$ is not within the seeking range, the processing flow proceeds to step S11-4. Note that the predetermined seeking range is defined by an upper limit and a lower limit predetermined for each of parameters.

In step S11-3, a step size $\Delta^m p$ predetermined for the parameter $^m p$ is added to the parameter $^m p$ thereby updating the parameter $^m p$ in the positive direction. Thereafter, in step S12 and following steps, the commanded trajectory $u_{k+1}$ is calculated using the currently selected compensator whose parameter $^m p$ is updated in the positive direction.

On the other hand, in a case where it is determined in step S11-2 that the parameter $^m p$ is not within the seeking range, the processing flow proceeds to step S11-4, in which the seeking direction is changed to be negative (d is changed to be negative), and the processing flow returns to step S11-1. Because the seeking direction is now negative, the processing flow proceeds to step S11-5, and it is determined whether the value of the parameter $^m p$ is within the predetermined seeking range. In a case where the parameter parameter $^m p$ is within the seeking range, the processing flow proceeds to step S11-6, in which the step size $\Delta^m p$ predetermined for the parameter $^m p$ is subtracted from the parameter $^m p$ thereby updating the parameter $^m p$ in the negative direction. Thereafter, in step S12 and following steps, the commanded trajectory $u_{k+1}$ is calculated using the currently selected compensator whose parameter $^m p$ is updated in the negative direction.

In a case where it is determined in step S11-5 that the parameter $^m p$ is not within the seeking range, the processing flow proceeds to step S11-7, in which it is determined whether the parameter seeking process is completed for all parameters. In a case where seeking is not completed for all parameters, the processing flow proceeds to step S11-8, in which the parameter whose value is to be sought is changed and the seeking direction d is initially set to be positive. Thereafter, the processing flow returns to step S11-1 to start seeking an optimum value for another parameter.

In a case where it is determined in step S11-7 that seeking is completed for all parameters, the processing flow proceeds to step S11-9. In this case, seeking is completed for all parameters included in the formula defining the m-th compensator, and thus in step S11-9, the compensator number m is updated (m=m+1) and the processing flow proceeds to step S11-10. In step S11-10, it is determined whether all compensators have been selected or not. In a case where all compensators have not been selected, the processing flow returns to step S11-1, to start seeking a suitable value of a parameter for another newly selected compensator. In a case where all compensators have been selected (and seeking is completed for all compensators), the processing flow proceeds to step S11-11, in which the compensator number is returned to the initial value (m=1). Thereafter the processing flow returns to step S11-1 to again seek suitable parameter values starting with the first compensator.

Figure 13:
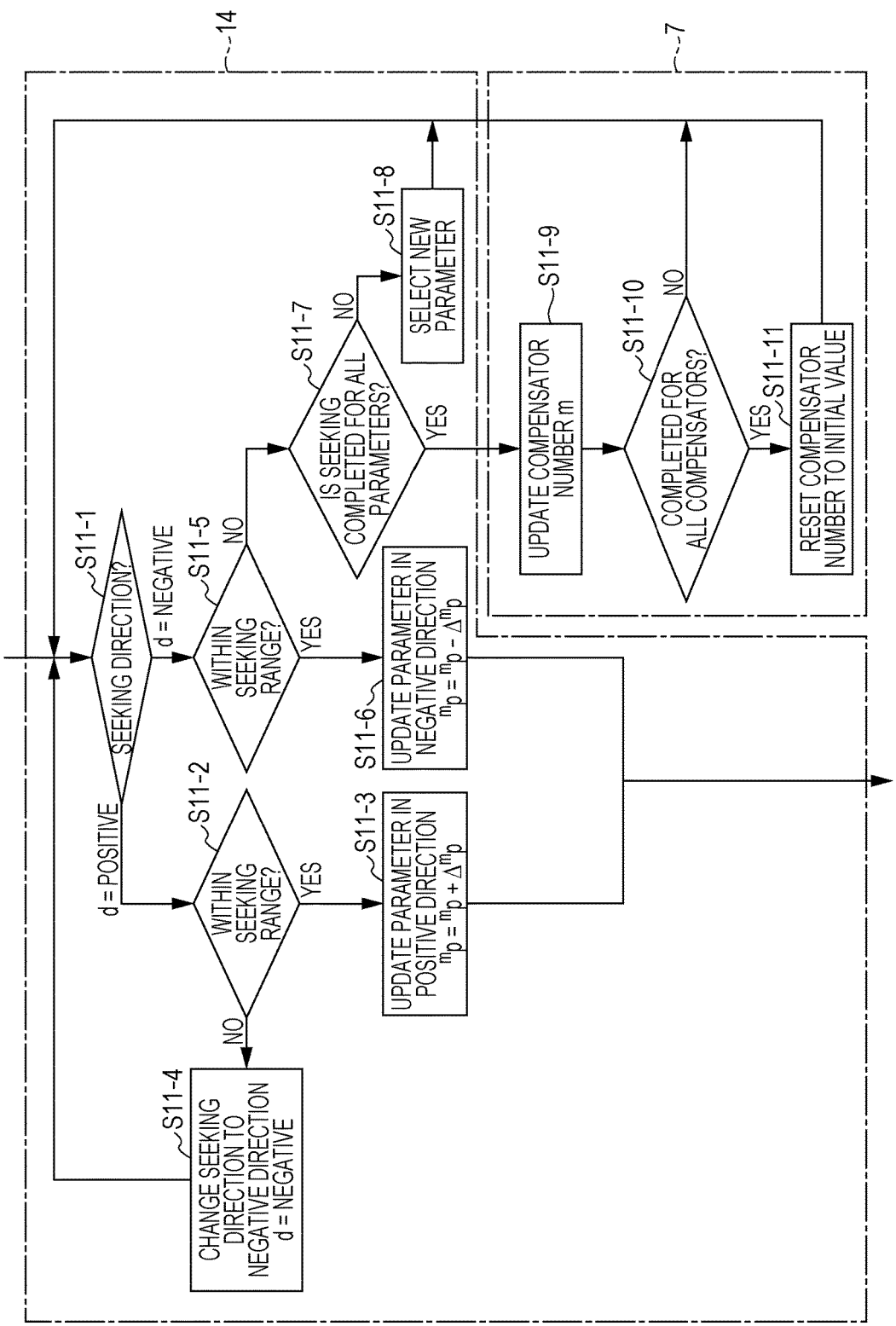
FIG. 13 is a flow chart illustrating a learning control according to the second embodiment in which only a process of changing a parameter and a compensator number in the learning control is shown.

By performing the process according to the flow chart illustrated in FIG. 13 in the above-described manner, the compensator number m and parameter $^m p$ of the m-th compensator are sought and suitable values are determined. Using the compensator number m and the parameter $^m p$ determined in the seeking, the correction of the trajectory is calculated sequentially.

The operation is performed in a similar manner to the first embodiment except for the steps described above, and thus a further description is omitted.

Note that no problems occur even if degradation occurs in evaluation value $E_k$ when the robot is operated using the selected compensator. As described above, when degradation in evaluation value $E_k$ occurs, the compensator is automatically changed to another compensator, and seeking is performed for various parameters without concern for stability.

In the second embodiment, as described above, even when parameters are not known which are included in a formula defining a compensator used in the learning control operation, parameter values are automatically adjusted to improve the evaluation value on the trajectory error.

Third Embodiment

Next, a third embodiment, which is a partial modification of the first embodiment, is described below with reference to FIG. 14. The third embodiment is different from the first embodiment in that the best commanded trajectory $u_{best}$ is stored in a different manner from that according to the first embodiment. In the third embodiment, a previous correction of the trajectory is stored. When degradation occurs, the commanded trajectory is returned to the previous commanded trajectory and is employed as the best commanded trajectory $u_{best}$. As a result the best commanded trajectory $u_{best}$ is effectively stored.

Figure 14:
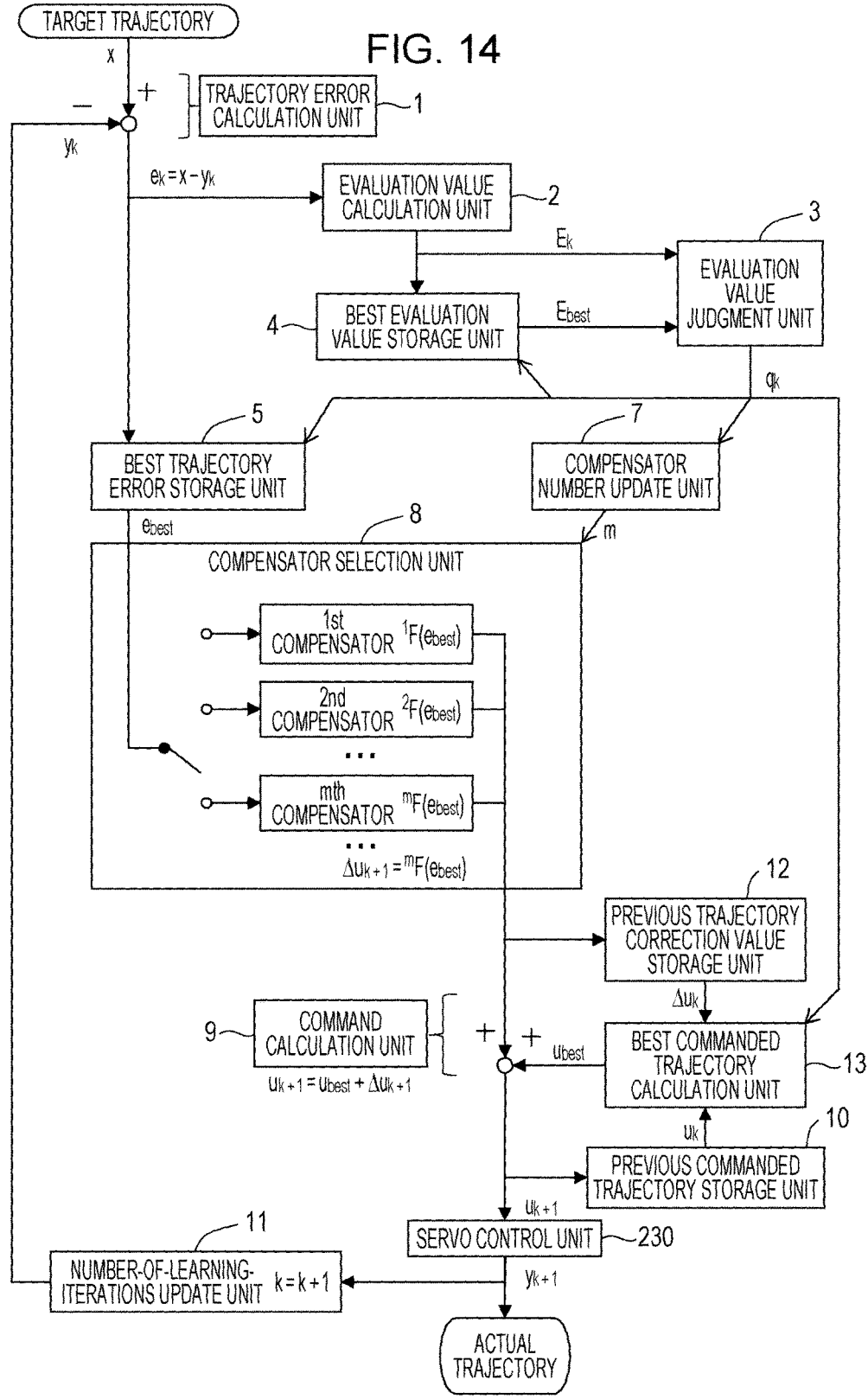
FIG. 14 is a block diagram illustrating a learning control according to a third embodiment.

In the third embodiment, as illustrated in FIG. 14, a previous correction of trajectory storage unit 12 and a best commanded trajectory calculation unit 13 are provided. The previous correction of trajectory storage unit 12 stores the correction of the trajectory $\Delta u_k$. In a case where an improvement in the evaluation result $q_k$ is obtained, the best commanded trajectory calculation unit 13 employs the previous commanded trajectory $u_k$ as the best commanded trajectory $u_{best}$ as in the first embodiment ($u_{best}=u_k$). In a case where degradation occurs in the evaluation result $q_k$, the best commanded trajectory calculation unit 13 subtracts the previous correction of the trajectory $\Delta u_k$ from the previous commanded trajectory $u_k$ and employs the result as the best commanded trajectory $u_{best}$ ($u_{best}=u_k-\Delta u_k$). Because the correction of the trajectory $\Delta u_k$ that caused the degradation is subtracted, the best commanded trajectory $u_{best}$ is obtained as a result.

The operation is performed in a similar manner to the first embodiment except for the steps described above, and thus a further description is omitted. In the third embodiment, by storing the previous correction of the trajectory, it is allowed to obtain the same effect as that obtained by storing the best commanded trajectory.

Fourth Embodiment

Next, a fourth embodiment, which is a partial modification of the first embodiment, is described below with reference to FIGS. 15A and 15B. This fourth embodiment is different from the first embodiment in that an upper limit of the evaluation value is predetermined. If the evaluation value becomes greater than this upper limit, the learning control operation is restarted.

Figure 4A:
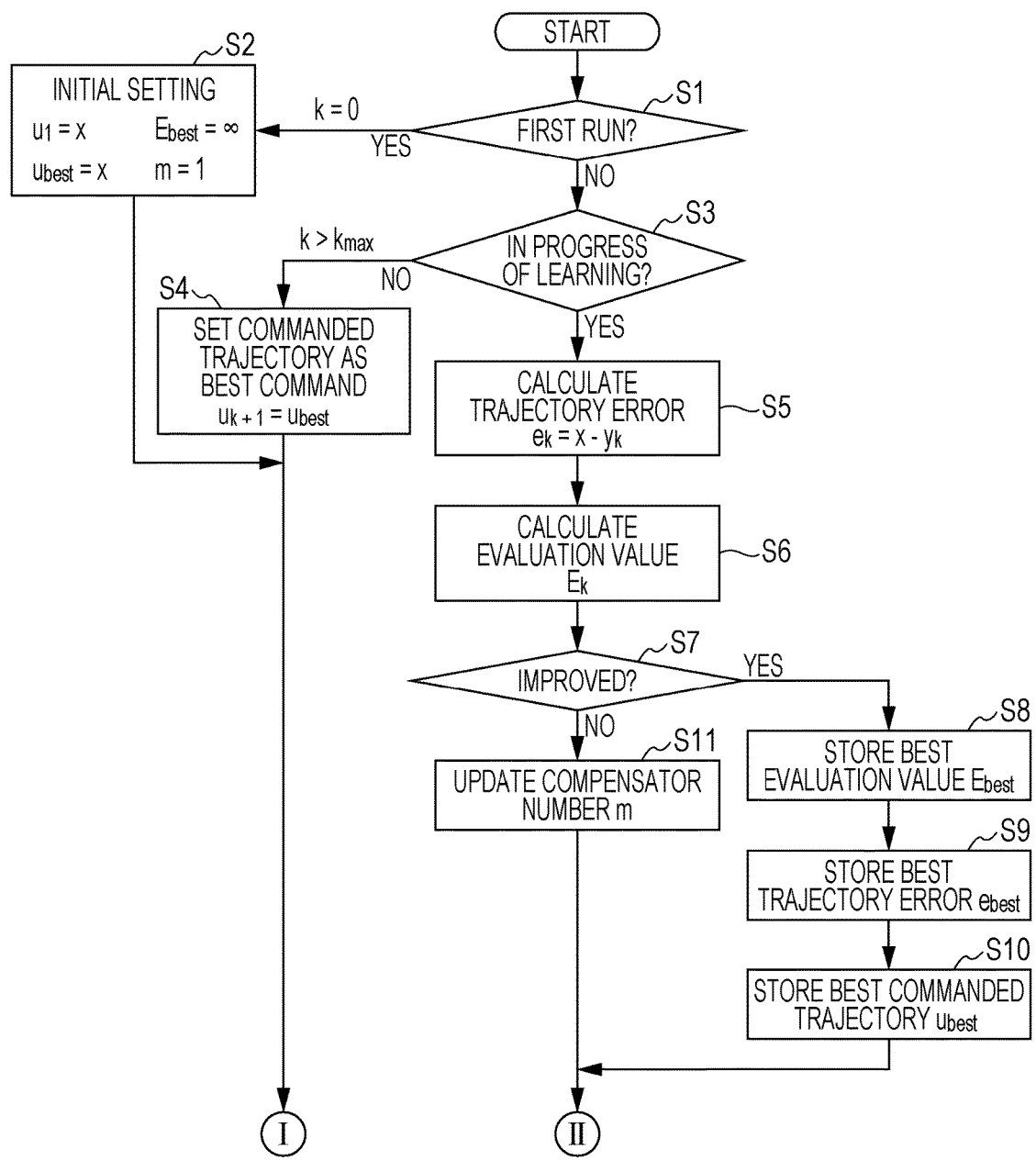
FIGS. 4A and 4B are flow charts illustrating a learning control according to the first embodiment.
Figure 4B:
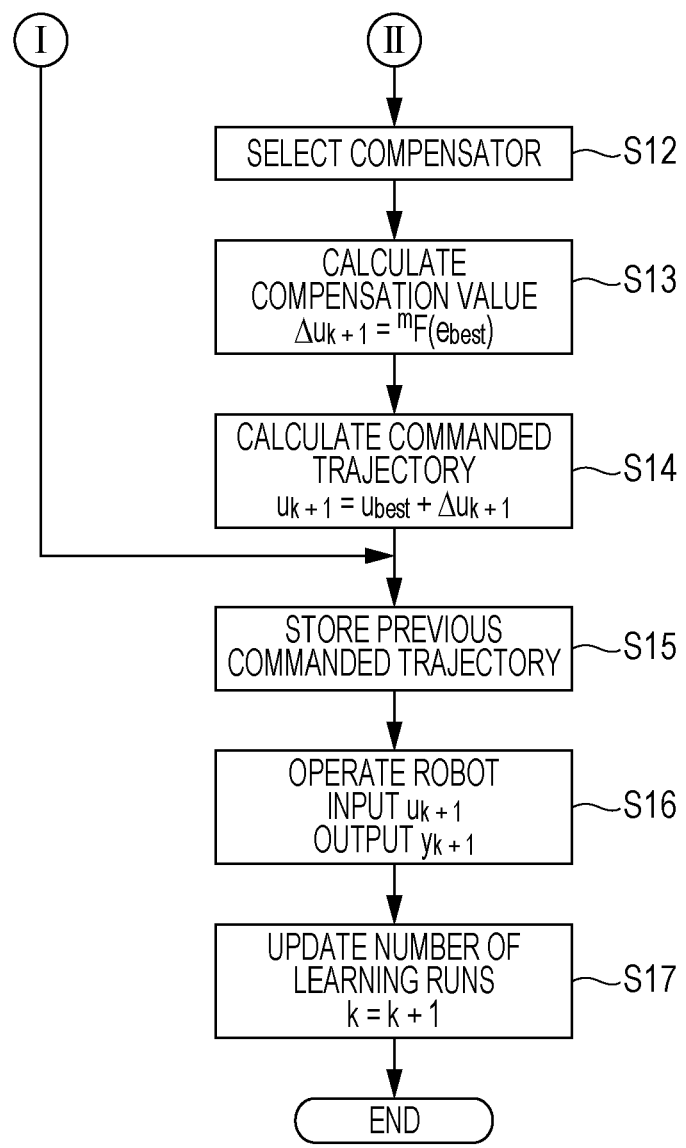
Figure 15B:
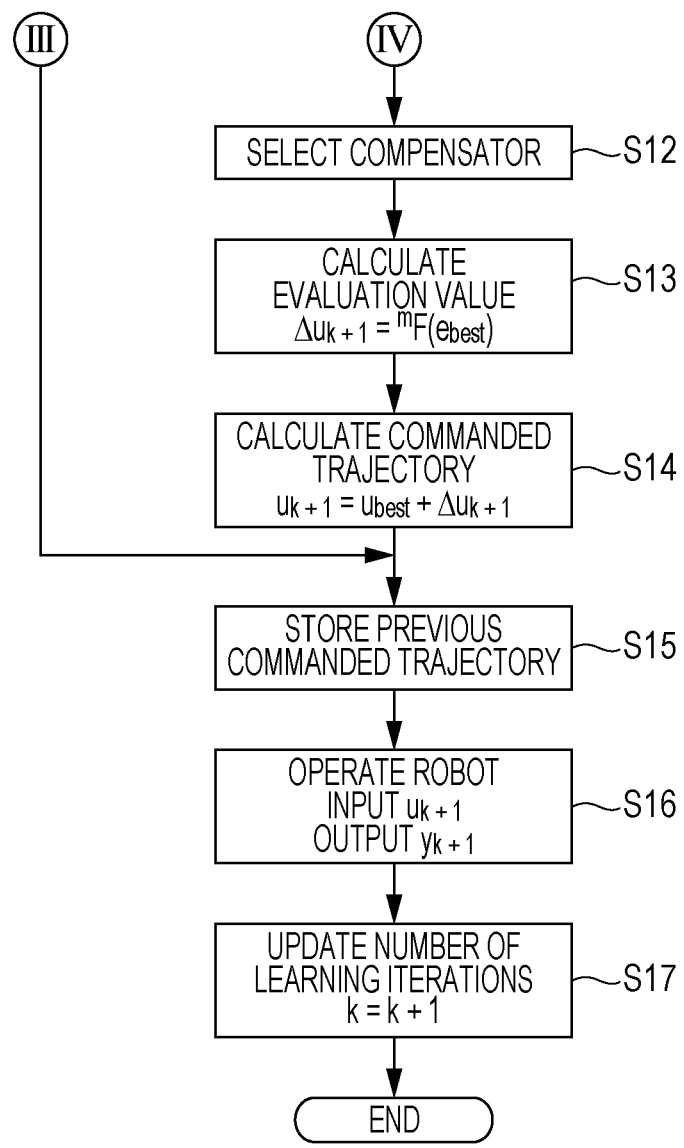

As illustrated in FIGS. 15A and 15B, the operation flow according to the fourth embodiment further includes, in addition to steps of the flow chart in FIGS. 4A and 4B, steps S20 to S22 that are performed after the trajectory error $e_k$ is calculated in step S5 and the evaluation value $E_k$ is calculated in step S6. In step S20, it is determined whether the number of iterations of learning k is greater than the predetermined maximum number of iterations $k_{max}$. In a case where the number of iterations of learning k is not greater than the maximum number of iterations $k_{max}$, the learning is in progress, and thus the processing flow directly proceeds to step S7. However, in a case where the number of iterations of learning k is greater than the maximum number of iterations $k_{max}$, the learning is in a stopped state, and thus the processing flow proceeds to step S21.

In step S21, it is determined whether the evaluation value $E_k$ has exceeded the upper limit $E_{max}$. In a case where the evaluation value $E_k$ has not exceeded the upper limit $E_{max}$, the processing flow proceeds to step S4 while maintaining the state in which the learning is stopped. In step S4, the driving using the best commanded trajectory $u_{best}$ is continued as in the first embodiment.

On the other hand, in a case where the evaluation value $E_k$ has exceeded the upper limit $E_{max}$, then, to restart the learning, the processing flow proceeds to step S22. In step S22, the maximum number of iterations of learning $k_{max}$ is updated by increasing the maximum number of iterations of learning $k_{max}$ by an incremental number of iterations $\Delta k$ which is predetermined, for example, as 10 ($k_{max}=k_{max}+\Delta k$) (learning restart step). Therefore, to restart the learning, the processing flow proceeds to step S7. Step S7 and following steps are similar to those according to the first embodiment, and thus a further description thereof is omitted.

In the third embodiment, as described above, the evaluation value $E_k$ is monitored in step S21 even during the state in which the learning is stopped. If degradation in the evaluation value $E_k$ occurs, the number of iterations of learning is updated in step S22 and the learning is restarted. When a change in characteristic of the robot arm occurs due to a change in an environment such as temperature, there is a possibility that the trajectory error $e_k$ becomes worse. In a case where the trajectory error $e_k$ becomes worse, the learning is automatically restarted to reduce the error.

The operation is performed in a similar manner to the first embodiment except for the steps described above, and thus a further description is omitted.

In the embodiments described above, it is assumed by way of example but not limitation that rotary joints are driven, but a prismatic joint may also be driven in a similar manner.

In the embodiments described above, it is assumed by way of example but not limitation that the target trajectory x of a joint is given and the actual trajectory y thereof is measured. The target trajectory x may be a target trajectory of a position/posture of a tip of a hand of a robot and the actual trajectory y may be an actual trajectory thereof. In this case, the servo control unit 230 receives an input indicating the position/posture of the tip of the hand of the robot arm and calculates angles of the respective joints, that is, the servo control unit 230 solves an inverse kinematics problem and operates the robot arm according to an obtained solution. In this case, the operation result is obtained by calculating the position/posture of the tip of the hand of the robot from the obtained angles of the respective joints, that is, the inverse kinematics problem is solved and a resultant solution is output.

In the embodiments described above, it is assumed by way of example but not limitation that the robot is a 6-joint robot. However, there is no specific restriction on the number of joints, and each joint may be a rotary joint or a prismatic joint.

In the embodiments described above, it is assumed by way of example but not limitation that the target trajectory and the actual trajectory are both represented by time-series position vector data. However, the trajectory of the robot arm may be given not by a position but a speed. In any case, the learning control may be performed in a similar manner. In the case where the trajectory of the robot arm is given by a speed, the servo control unit 230 receives an input indicating the speed and outputs a speed obtained as an operation result. Still alternatively, the target trajectory may be given not by a position but time-series acceleration data. Also in this case, the learning control may be performed in a similar manner.

Although in the first, third, and fourth embodiments, no description has been given about seeking of parameters of a compensator, a plurality of compensators having different parameters may be provided and the compensator number may be selected as necessary thereby making it possible to achieve an effect similar to that achieved by the seeking of parameters.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the present embodiments, when the evaluation value of the trajectory error becomes better than the evaluation value stored in the storage unit, the commanded trajectory used in this situation is stored, and thus the stored commanded trajectory is updated to a better commanded trajectory, which prevents the commanded trajectory from being degraded. On the other hand, when the evaluation value of the trajectory error becomes worse, the commanded trajectory given in this situation is not stored, and the compensator that calculates the amount of correction of the commanded trajectory is changed to another compensator. Thus, it is possible to handle various different control frequency bands such as a low frequency band, a high frequency band, and the like by sequentially changing the compensator, and thus it is possible to achieve a further better learning effect. Thus, it is possible to improve the trajectory error by performing the learning control repeatedly, and it is possible to finally obtain a small trajectory error.

For example, if learning is performed repeatedly using a compensator that is unstable from the point of view of the feedback control theory, there is a possibility that an oscillation may occur in the commanded trajectory obtained as a result of the learning, that is, there is a possibility that the learning control operation is unstable. In the present embodiments, in contrast, when the evaluation value becomes worse, the compensator is changed to another compensator and thus it is possible to prevent the learning control operation from becoming unstable. Therefore, it is allowed to select a compensator from various compensators without concern for stability.

For example, when the trajectory error suddenly becomes worse than the previous trajectory error due to noise or for some other reasons, if the commanded trajectory given in this situation is stored and the learning control operation is continued, the learning control operation is continued from a state in which the commanded trajectory becomes worse, and thus a delay occurs in the progress of the learning. However, in the embodiments described above, the degraded commanded trajectory is not used in the next learning but the learning control operation is continued always using a good commanded trajectory. Therefore, even an occurrence of degradation in the evaluation value does not influence the next learning, and it is possible to prevent a reduction in the learning speed from occurring due to the degradation in the evaluation value.

Furthermore, in the embodiments described above, the compensator may be changed, for example, in such a manner that a high-gain compensator is first selected to achieve a quick convergence although it may have instability, and a low-gain compensator is selected when the evaluation value becomes worse. This makes it possible to increase the learning speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-242722, filed Nov. 25, 2013, which is hereby incorporated by reference herein in its entirety.

What is claimed is:

1. A robot control method capable of, by a control unit, controlling a robot so as to be driven according to a commanded trajectory, detecting an actual trajectory along which the robot is driven, and controlling the commanded trajectory by learning based on a trajectory error between the actual trajectory and a target trajectory, the method comprising:

calculating, by the control unit, a trajectory error; and
controlling, by the control unit, the commanded trajectory by learning,
the controlling by learning including
performing storing, by the control unit, such that in a case where the calculated trajectory error is less than a trajectory error stored in a storage unit, the trajectory error stored in the storage unit is updated by the calculated trajectory error, the calculated trajectory error is stored in the storage unit, and a commanded trajectory stored in the storage unit is updated by a commanded trajectory based on which the calculated trajectory error is obtained,
changing, by the control unit, a first compensator to a second compensator such that in a case where the calculated trajectory error is more than the trajectory error stored in the storage unit, the first compensator is changed to the second compensator that is configured to calculate an amount of correction of the commanded trajectory from the trajectory error and that is configured to calculate the amount of correction in a different manner from a manner in which the first compensator calculates the amount of correction, and
calculating, by the control unit, a commanded trajectory in a next-time operation such that the amount of correction for the commanded trajectory stored in the storage unit is calculated using a selected compensator, and the commanded trajectory in the next-time operation is calculated from the calculated amount of correction and the commanded trajectory stored in the storage unit,
wherein the second compensator is a proportional compensator, an integral compensator, a derivative compensator, a PID compensator, a low pass filter, a second-order derivative compensator, a time delay compensator, a time advance compensator or a notch filter, and
wherein in changing, by the control unit, the first compensator, when the first compensator is changed to the second compensator configured to calculate the amount of correction in a different manner from the manner in which the first compensator calculates the amount of correction, the first compensator is changed by changing a formula defining the second compensator and one or more parameters included in the formula such that a value of each parameter is changed within a predetermined range, and the formula is changed.

2. A robot control method capable of, by a control unit, controlling a robot so as to be driven according to a commanded trajectory, detecting an actual trajectory along which the robot is driven, and controlling the commanded trajectory by learning based on a trajectory error between the actual trajectory and a target trajectory, the method comprising:

calculating, by the control unit, a trajectory error; and
controlling, by the control unit, the commanded trajectory by learning,
the controlling by learning including
performing storing, by the control unit, such that in a case where the calculated trajectory error is less than a trajectory error stored in a storage unit, the trajectory error stored in the storage unit is updated by the calculated trajectory error, the calculated trajectory error is stored in the storage unit, and a commanded trajectory stored in the storage unit is updated by a commanded trajectory based on which the calculated trajectory error is obtained,
changing, by the control unit, a first compensator to a second compensator such that in a case where the calculated trajectory error is more than the trajectory error stored in the storage unit, the first compensator is changed to the second compensator that is configured to calculate an amount of correction of the commanded trajectory from the trajectory error and that is configured to calculate the amount of correction in a different manner from a manner in which the first compensator calculates the amount of correction, and
calculating, by the control unit, a commanded trajectory in a next-time operation such that the amount of correction for the commanded trajectory stored in the storage unit is calculated using a selected compensator, and the commanded trajectory in the next-time operation is calculated from the calculated amount of correction and the commanded trajectory stored in the storage unit,
wherein the second compensator is a proportional compensator, an integral compensator, a derivative compensator, a PID compensator, a low pass filter, a second-order derivative compensator, a time delay compensator, a time advance compensator or a notch filter, wherein the second compensator includes at least a proportional compensator, a lowpass filter, and a time advance compensator, and wherein in changing, by the control unit, the first compensator, in a case where the second compensator is selected at the beginning of the learning control and when the first compensator is changed to the second compensator configured to calculate the amount of correction in a different manner from a manner in which the second compensator calculates the amount of correction, the first compensator is changed to the second compensator realized by connecting in series the lowpass filter and the time advance compensator and a cutoff frequency of the lowpass filter is set to be lower than a natural vibration frequency of the robot and an advanced time of the time advance compensator is set to be shorter than a vibration period of a natural vibration of the robot.

3. The robot control method according to claim 1, further comprising:

counting, by the control unit, a number of iterations of learning control performed; and stopping, by the control unit, the learning control such that in a case where the counted number of iterations of learning control performed exceeds a maximum number of iterations, the learning control is stopped and the robot is controlled so as to be driven according to the commanded trajectory stored in the storage unit.

4. The robot control method according to claim 3, further comprising:

starting, by the control unit, the learning control such that in a case where the calculated trajectory error exceeds a predetermined upper limit, the maximum number of iterations is increased and the learning control is started.

5. A robot control apparatus capable of controlling a robot so as to be driven according to a commanded trajectory, detecting an actual trajectory along which the robot is driven, and controlling the commanded trajectory by learning based on a trajectory error between the actual trajectory and a target trajectory, the apparatus comprising:

a control unit configured to calculate a trajectory error and perform the controlling by learning; and a storage unit capable of storing the trajectory error and the commanded trajectory, the control unit being configured to perform the controlling by learning such that in a case where the calculated trajectory error is less than the trajectory error stored in the storage unit, the trajectory error stored in the storage unit is updated by the calculated trajectory error, the calculated trajectory error is stored in the storage unit and the commanded trajectory stored in the storage unit is updated by a commanded trajectory based on which the calculated trajectory error is obtained, in a case where the calculated trajectory error is more than the trajectory error stored in the storage unit, a first compensator configured to calculate an amount of correction of the commanded trajectory from the trajectory error is changed to a second compensator configured to calculate the amount of correction in a different manner from a manner in which the first compensator calculates the amount of correction, the amount of correction of the commanded trajectory stored in the storage unit is calculated using the currently selected compensator, and a commanded trajectory in the next-time operation is calculated from the calculated amount of correction and the commanded trajectory stored in the storage unit, wherein the second compensator is a proportional compensator, an integral compensator, a derivative compensator, a PID compensator, a low pass filter, a second-order derivative compensator, a time delay compensator, a time advance compensator or a notch filter, and wherein in changing, by the control unit, the first compensator, when the first compensator is changed to the second compensator configured to calculate the amount of correction in a different manner from the manner in which the first compensator calculates the amount of correction, the first compensator is changed by changing a formula defining the second compensator and one or more parameters included in the formula such that a value of each parameter is changed within a predetermined range, and the formula is changed.

* * * * *